(12) United States Patent
Tomoda et al.

(10) Patent No.: US 12,537,027 B1
(45) Date of Patent: Jan. 27, 2026

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Yusuke Tomoda, Yokohama Kanagawa (JP); Takayuki Kawabe, Sagamihara Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/022,799

(22) Filed: Jan. 15, 2025

(30) Foreign Application Priority Data

Sep. 11, 2024 (JP) ................. 2024-157235

(51) Int. Cl.
| | | |
|---|---|---|
| *G11B 20/18* | (2006.01) | |
| *G11B 5/55* | (2006.01) | |
| *G11B 20/12* | (2006.01) | |

(52) U.S. Cl.
CPC ........ *G11B 20/1879* (2013.01); *G11B 5/5547* (2013.01); *G11B 20/1217* (2013.01); *G11B 2020/1238* (2013.01)

(58) Field of Classification Search
None
See application file for complete search history.

(56) References Cited

U.S. PATENT DOCUMENTS

| | | | | |
|---|---|---|---|---|
| 4,745,587 | A * | 5/1988 | Maeda | G11B 7/08529 |
| 5,859,742 | A * | 1/1999 | Takaishi | G11B 21/083 |
| | | | | 360/78.01 |
| 6,169,382 | B1 * | 1/2001 | McKenzie | G11B 5/5547 |
| | | | | 700/39 |
| 6,538,840 | B1 * | 3/2003 | Seewald | G11B 5/5556 |
| | | | | 360/73.02 |
| 8,077,428 | B1 | 12/2011 | Chen et al. | |
| 8,908,310 | B1 | 12/2014 | Bai et al. | |
| 8,922,931 | B1 | 12/2014 | Ji et al. | |
| 10,748,567 | B1 | 8/2020 | Zaitsu et al. | |
| 2002/0131195 | A1 * | 9/2002 | Dehnert | G11B 5/5547 |
| | | | | 360/78.07 |
| 2006/0028933 | A1 * | 2/2006 | Liu | G11B 7/08588 |
| 2018/0336923 | A1 * | 11/2018 | Hironaka | G11B 5/5547 |
| 2021/0096764 | A1 * | 4/2021 | Calfee | G06F 3/0676 |
| 2023/0260540 | A1 | 8/2023 | Maeto | |

FOREIGN PATENT DOCUMENTS

JP 2023-119547 A 8/2023

* cited by examiner

*Primary Examiner* — Peter Vincent Agustin
(74) *Attorney, Agent, or Firm* — Kim & Stewart LLP

(57) ABSTRACT

According to one embodiment, during a first write period, an adjustment unit derives a first predicted excess amount and a predicted upper limit threshold value, and a correction limit prediction unit calculates a first cumulative predicted excess amount. The determination unit causes the write processing unit to continue the write processing if determining that the first cumulative predicted excess amount is smaller than or equal to the predicted upper limit threshold value, and causes the write processing unit to suspend the write processing if determining that the first cumulative predicted excess amount exceeds the predicted upper limit threshold value.

14 Claims, 21 Drawing Sheets

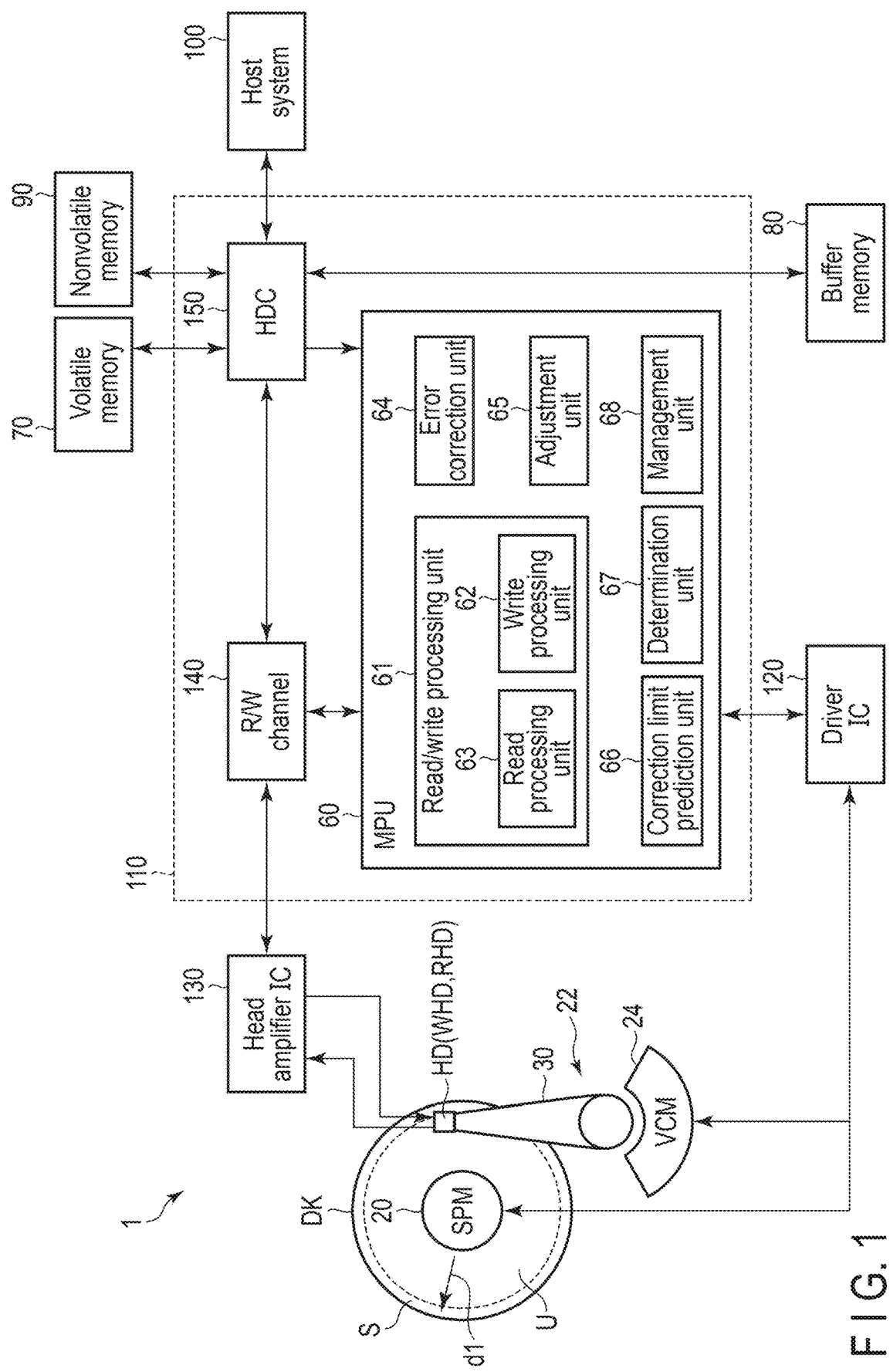
F I G. 1

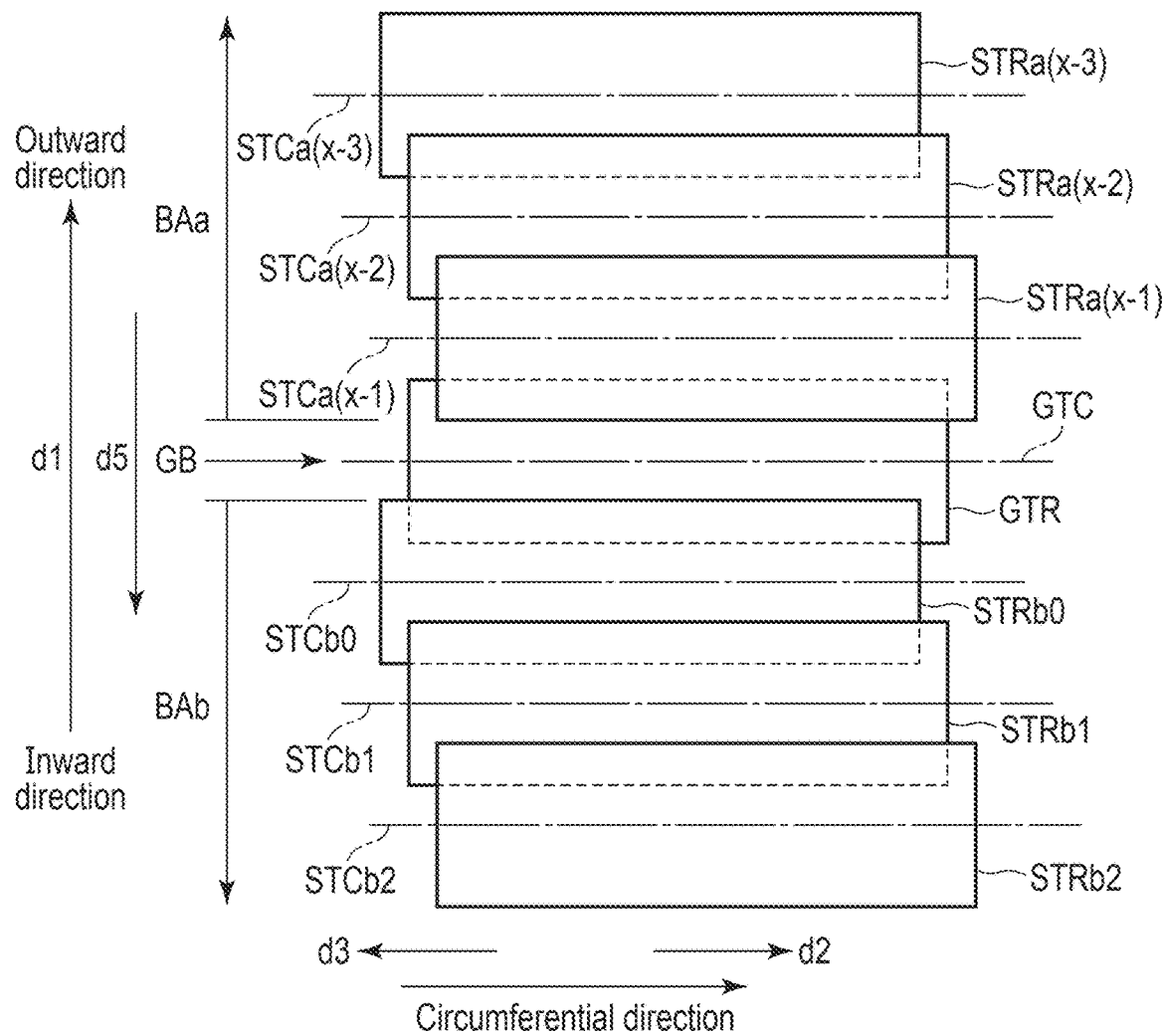
F I G. 7
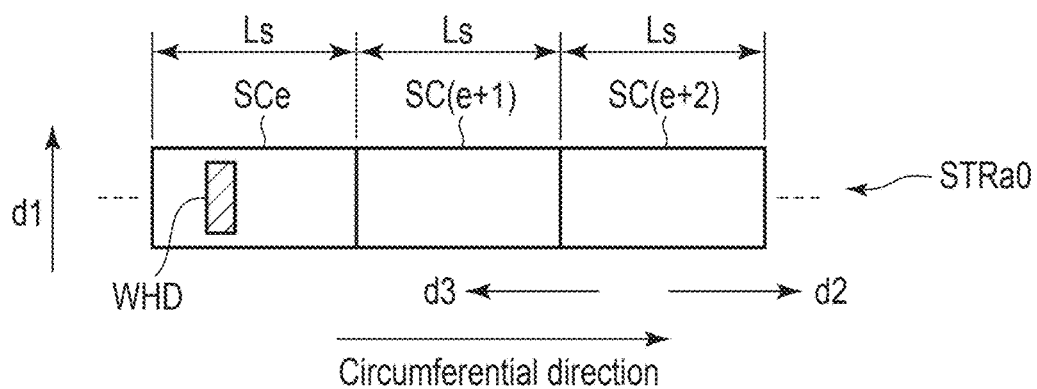
F I G. 8

| | First write operation | Second write operation | | |
|---|---|---|---|---|
| | | First method | Second method | Third method |
| Track ECC | None | Yes | Yes | Yes |
| Name of function to control DOL | DDOL | iDDOL | iDDOL | iDDOL |
| Processing when PE exceeds PO | Suspend write processing and shift to write retry processing | Determine whether to continue write processing or end write processing and execute PTS | Determine whether to continue write processing or end write processing and execute PTS | Determine whether to continue write processing, or end write processing and execute PTS, or suspend write processing and shift to write retry processsing |
| Predicted upper limit threshold value | None | Constant | Constant (or variable) | Constant (or variable) |
| Predicted excess amount | None | Fix to maximum predicted excess amount which becomes maximum | Adjustable | Adjustable |

F I G. 13

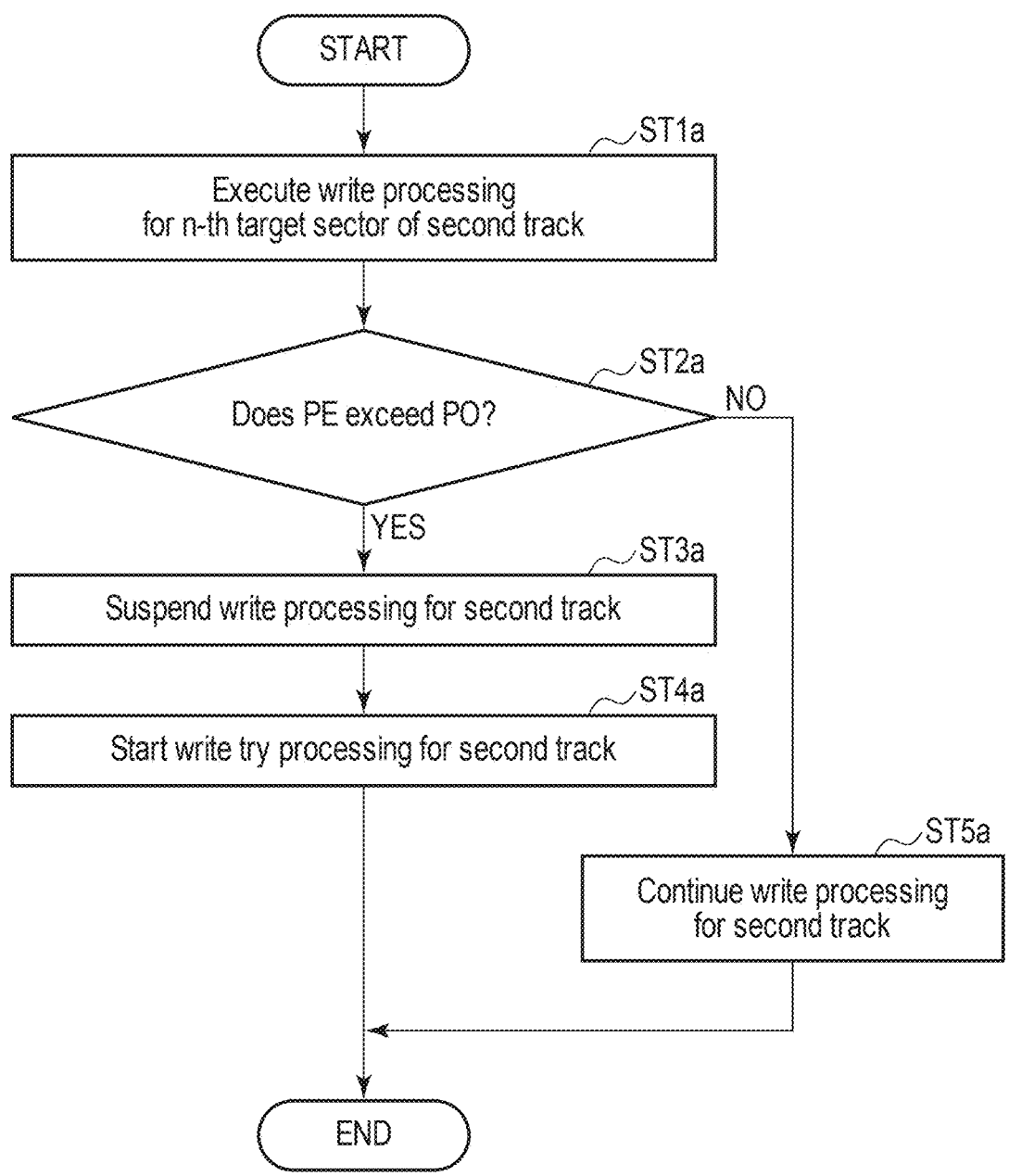
F I G. 18

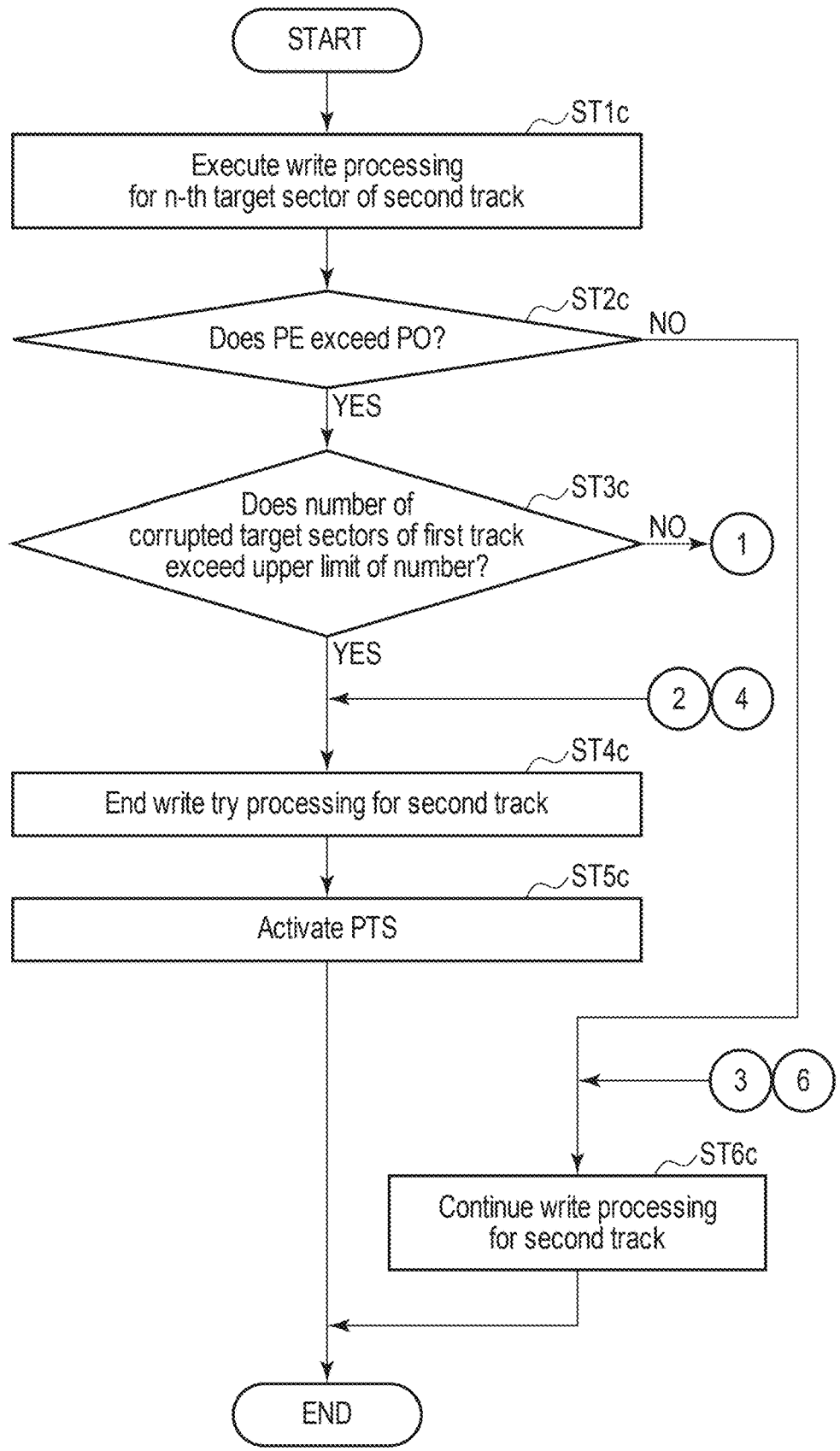
F I G. 21

MAGNETIC DISK DEVICE

CROSS-REFERENCE TO RELATED APPLICATIONS

This application is based upon and claims the benefit of priority from Japanese Patent Application No. 2024-157235, filed Sep. 11, 2024, the entire contents of which are incorporated herein by reference.

FIELD

Embodiments described herein relate generally to a magnetic disk device.

BACKGROUND

Magnetic disk devices such as a Conventional Magnetic Recording (CMR) (or conventional recording) magnetic disk device that writes data to a plurality of tracks at intervals in the radial direction of the disk, a Shingled Magnetic Recording (SMR) magnetic disk device that overwrites data to a plurality of tracks in the radial direction of the disk, and a hybrid recording type magnetic disk device that selectively executes the conventional magnetic recording and the shingled magnetic recording, are known.

BRIEF DESCRIPTION OF THE DRAWINGS

FIG. 1 is a block diagram showing a configuration of a magnetic disk device according to an embodiment.

FIG. 7 is a schematic diagram showing two bands and one guard band of the user data area shown in FIG. 6.

FIG. 8 is a schematic diagram showing three sectors of one track of the band shown in FIG. 6.

FIG. 13 is a table showing the presence or absence of a track ECC in the first to third methods of the first and second write operations, the name of the function that controls DOL, the contents of the processing in a case where the positioning error exceeds the reference radius position, the setting of the predicted upper limit threshold value, and the setting of the predicted excess amount.

FIG. 18 is a flowchart showing a write processing method for an n-th target sector of the second track, of the write processing method for the above-described embodiment, illustrating a case where the above-described magnetic disk device adopts the first write operation during the first write period.

FIG. 21 is a flowchart showing a write processing method for an n-th target sector of the second track, of the write processing method for the above-described embodiment, illustrating a case where the above-described magnetic disk device adopts the third method of the second write operation during the first write period and the second write period.

DETAILED DESCRIPTION

Figure 2:
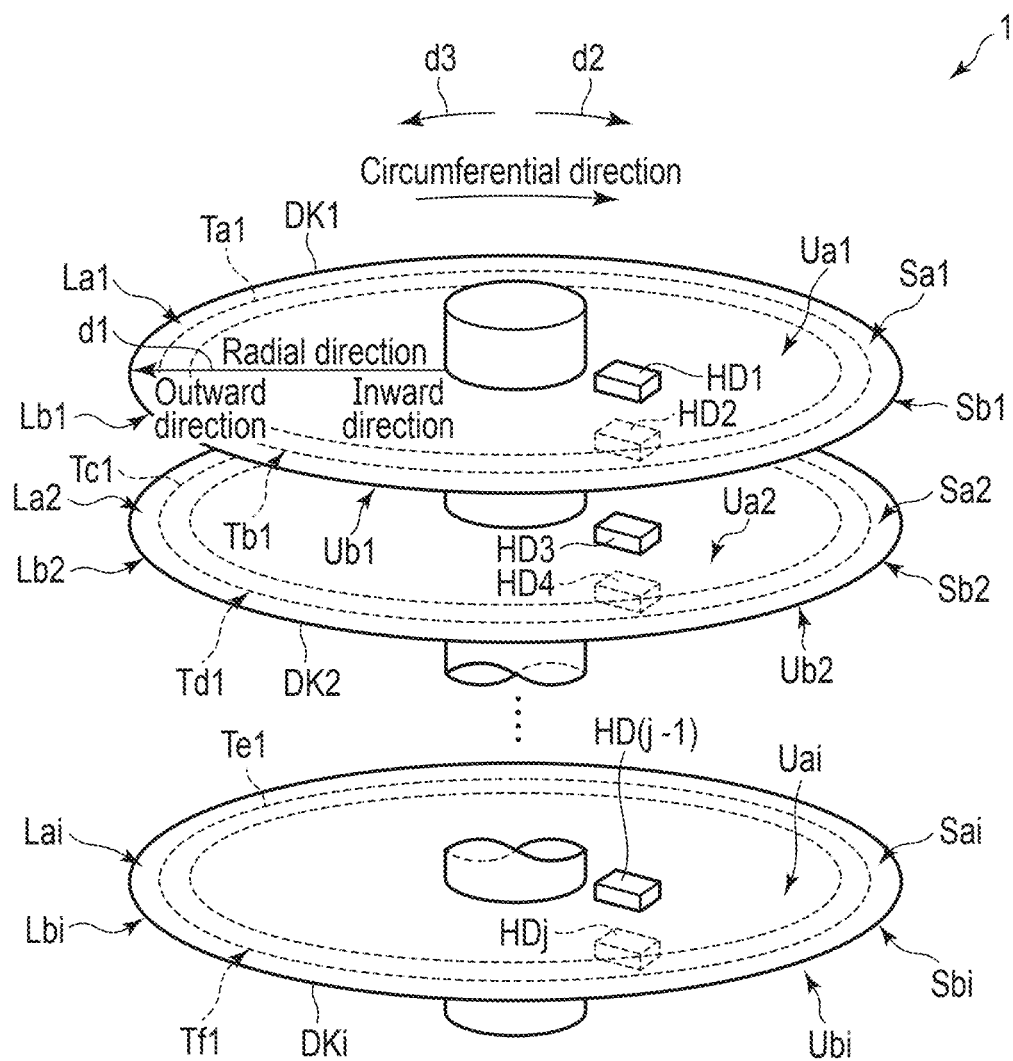
FIG. 2 is a perspective view showing parts of the magnetic disk device, illustrating a plurality of disks and a plurality of heads.

In general, according to one embodiment, there is provided a magnetic disk device comprising: a disk having a first data track and a second data track adjacent to each other in a recording layer, the first data track and the second data track each including a plurality of target sectors being targets to which data is written, the first data track being located in a first direction parallel to a radial direction of the disk as viewed from the second data track; a head including a write head writing data to the recording layer and a read head reading data from the recording layer; a read processing unit capable of executing seek processing of seeking the read head; a write processing unit capable of executing write processing of writing data to the recording layer; an error correction unit executing error correction of data in one or more corrupted target sectors whose data is determined to be corrupted, among the plurality of target sectors of the first data track; an adjustment unit; a correction limit prediction unit; and a determination unit.

During a first write period being a period elapsed after the write processing unit executes the write processing for the plurality of target sectors of the first data track and being the period during which the write processing unit executes the write processing for the plurality of target sectors of the second data track, the read processing unit executes first seek processing of seeking the read head, moves the read head at a first distance, and makes the write head face the second data track, the adjustment unit derives a first predicted excess amount at which a position of the write head is expected to be displaced beyond a reference radius position in the first direction during the first write period, the first predicted excess amount being varied in accordance with a distance for seeking the read head, and derives a predicted upper limit threshold value indicating a limit of a range in which the error correction for the first data track is executable, the predicted upper limit threshold value being a constant, each time data is written to each of the plurality of target sectors of the second data track, the correction limit prediction unit measures an actual excess amount of the position of the write head, which is displaced beyond the reference radius position in the first direction, updates a cumulative actual excess amount, which is a cumulative total of the actual excess amount, and calculates a first cumulative predicted excess amount obtained by adding the first predicted excess amount to the cumulative actual excess amount, and the determination unit causes the write processing unit to continue the write processing for the second track if determining that the first cumulative predicted excess amount is smaller than or equal to the predicted upper limit threshold value, and causes the write processing unit to suspend the write processing for the second data track if determining that the first cumulative predicted excess amount exceeds the predicted upper limit threshold value.

According to another embodiment, there is provided a magnetic disk device comprising: a disk having a first data track and a second data track adjacent to each other in a recording layer, the first data track and the second data track each including a plurality of target sectors being targets to which data is written, the first data track being located in a first direction parallel to a radial direction of the disk as viewed from the second data track; a head including a write head writing data to the recording layer and a read head reading data from the recording layer; a read processing unit capable of executing seek processing of seeking the read head; a write processing unit capable of executing write processing of writing data to the recording layer; an error correction unit executing error correction of data in one or more corrupted target sectors whose data is determined to be corrupted, among the plurality of target sectors of the first data track; an adjustment unit; a correction limit prediction unit; and a determination unit.

During a first write period being a period elapsed after the write processing unit executes the write processing for the plurality of target sectors of the first data track and being the period during which the write processing unit executes the write processing for the plurality of target sectors of the second data track, the read processing unit executes first seek processing of seeking the read head, moves the read head at a first distance, and makes the write head face the second data track, the adjustment unit derives a first predicted excess amount at which a position of the write head is expected to be displaced beyond a reference radius position in the first direction during the first write period, the first predicted excess amount being varied in accordance with a distance for seeking the read head, and derives a predicted upper limit threshold value indicating a limit of a range in which the error correction for the first data track is executable, the predicted upper limit threshold value having a smaller value as each of predicted excess amounts including the first predicted excess amount is increased, the predicted upper limit threshold value being a variable, each time data is written to each of the plurality of target sectors of the second data track, the correction limit prediction unit measures an actual excess amount of the position of the write head, which is displaced beyond the reference radius position in the first direction, updates a cumulative actual excess amount, which is a cumulative total of the actual excess amount, and calculates a first cumulative predicted excess amount obtained by adding the first predicted excess amount to the cumulative actual excess amount, and the determination unit causes the write processing unit to continue the write processing for the second data track if determining that the first cumulative predicted excess amount is smaller than or equal to the predicted upper limit threshold value, and causes the write processing unit to suspend the write processing for the second data track if determining that the first cumulative predicted excess amount exceeds the predicted upper limit threshold value.

A magnetic disk device 1 according to one embodiment will be described hereinafter with reference to the accompanying drawings. First, a configuration of the magnetic disk device 1 will be described. FIG. 1 is a block diagram showing the configuration of the magnetic disk device 1 according to the embodiment. In the embodiment, the magnetic disk device 1 is a hybrid recording magnetic disk device that selectively executes the conventional magnetic recording and the shingled magnetic recording. However, a technique to be described below may be applied to a magnetic disk device of the shingled magnetic recording or a magnetic disk device of the conventional magnetic recording.

As shown in FIG. 1, the magnetic disk device 1 comprises a plurality of, for example, one to ten disks (magnetic disks) DK serving as recording media, a spindle motor (SPM) 20 serving as a drive motor, a head stack assembly 22, a driver IC 120, a head amplifier integrated circuit (hereinafter referred to as a head amplifier IC or preamplifier) 130, a volatile memory 70, a buffer memory (buffer) 80, a nonvolatile memory 90, and a system controller 110 that is a single-chip integrated circuit. In addition, the magnetic disk device 1 is connected to a host system (hereinafter simply referred to as a host) 100.

Each of the disks DK is formed to have a diameter of, for example, 97 mm (3.8 inches) and has recording layers (magnetic recording layers) on both sides. Incidentally, in the embodiment, the magnetic disk device 1 comprises one to eleven disks DK, but the number of disks DK is not limited to this.

The head stack assembly 22 can control a head HD mounted on an arm 30 to move, i.e., seek to a target position on the disk DK by driving a voice coil motor (hereinafter referred to as VCM) 24. The VCM 24 functions as an actuator.

A user data area U that can be used by the user, and a system area S where information necessary for the system management is written are assigned to the area of the disk DK where the data can be written.

The head HD records and reproduces information on the disk DK. The head HD comprises a slider as a main body, and comprises a write head WHD and a read head RHD mounted on the slider. The write head WHD writes the data to the recording layer of the disk DK. The read head RHD reads the data from data tracks of the recording layer of the disk DK.

The "central part of the head HD" may be referred to as the "head HD", the "central part of the write head WHD" may be referred to as the "write head WHD", and the "central part of the read head RHD" may be referred to as the "read head RHD". The "central part of the write head WHD" may be simply referred to as the "head HD", and the "central part of the read head RHD" may be simply referred to as the "head HD".

The driver IC 120 controls driving the SPM 20 and the VCM 24 under control of the system controller 110 (more specifically, MPU 60 to be described later). The SPM 20 supports and rotates a plurality of disks DK.

The head amplifier IC 130 comprises a read amplifier and a write driver. The read amplifier amplifies a read signal read from the disk DK and outputs the amplified read signal to the system controller 110 (more specifically, a read/write (R/W) channel 140 to be described later). The write driver outputs a write current corresponding to a signal output from the R/W channel 140 to the head HD.

The volatile memory 70 is a semiconductor memory where the stored data is lost when power supply is cut off. The volatile memory 70 stores data necessary for processing in each unit of the magnetic disk device 1, and the like. The volatile memory 70 is a random access memory (RAM). The volatile memory 70 is, for example, a dynamic random access memory (DRAM). However, the volatile memory 70 may be a synchronous dynamic random access memory (SDRAM).

The buffer memory 80 is a semiconductor memory which temporarily records data transmitted and received between the magnetic disk device 1 and the host 100, and the like. Incidentally, the buffer memory 80 may be formed integrally with the volatile memory 80. The buffer memory 80 is a volatile RAM. Examples of the buffer memory 90 are a DRAM, a static random access memory (SRAM), an SDRAM, a ferroelectric random access memory (FeRAM), a magnetoresistive random access memory (MRAM), and the like.

The buffer memory 80 includes areas used as a read cache and a write cache, and temporarily stores commands and the like, which are received from the host 100.

The nonvolatile memory 90 is a semiconductor memory which records data stored even when power supply is cut off. The nonvolatile memory 90 is, for example, a NAND flash read only memory (FROM). However, the nonvolatile memory 90 may also be a NOR FROM.

The system controller (controller) 110 is realized by using, for example, a large scale integrated circuit (LSI) referred to as a system-on-a-chip (SoC) in which a plurality of elements are integrated on a single chip. The system controller 110 includes a read/write (R/W) channel 140, a hard disk controller (HDC) 150, and a microprocessor (MPU) 60. The system controller 110 is electrically connected to the driver IC 120, the head amplifier IC 130, the volatile memory 70, the buffer memory 80, the nonvolatile memory 90, and the host 100.

The R/W channel 140 executes signal processing of read data transferred from the disk DK to the host 100 and write data transferred from the host 100 in accordance with instructions from the MPU 60 to be described later. The R/W channel 140 comprises a circuit or function of modulating the write data. In addition, the R/W channel 140 comprises a circuit or a function of measuring the signal quality of the read data. The R/W channel 140 is electrically connected to, for example, the head amplifier IC 130, the HDC 150, the MPU 60 and the like.

The HDC 150 controls data transfer between the host 100 and the R/W channel 140 in accordance with instructions from the MPU 60. The HDC 150 is electrically connected to, for example, the R/W channel 140, the MPU 60, the volatile memory 70, the buffer memory 80, the nonvolatile memory 90, and the like.

The HDC 150 includes a gate generation unit. In accordance with commands from the host 100, instructions from the MPU 60, and the like, the gate generation unit generates various gates, for example, a write gate, a read gate, a servo gate, and the like and outputs the gates to the R/W channel 140, for example, the gate detection unit. In the following descriptions, "activating a predetermined gate" may be referred to as "asserting a predetermined gate". In addition, "falling down a predetermined gate" may be referred to as "negating the predetermined gate". In addition, "asserting a predetermined gate" and "negating a predetermined gate" may imply the meaning "generating a predetermined gate". Incidentally, the gate generation unit may be included in the R/W channel 140 or the MPU 60.

The R/W channel 140 includes a gate detection unit. The gate detection unit detects whether various gates, for example, the write gate, the read gate, the servo gate, and the like are in an asserted state or a negated state.

For example, the gate detection unit executes the write processing when detecting that the write gate is asserted, and suspends (stops) the write processing when detecting that the write gate is negated.

In addition, the gate detection unit executes the read processing when detecting that the read gate is asserted, and stops the read processing when detecting that the read gate is negated. The gate detection unit executes the servo read processing when detecting that the servo gate is asserted, and stops the servo read processing when detecting that the servo gate is negated. Incidentally, the gate detection unit may be provided inside the HDC 150 or the MPU 60.

The MPU 60 is a control unit or main controller which controls each of units of the magnetic disk device 1. The MPU 60 controls the VCM 24 via the driver IC 120 to execute servo control for positioning the head HD. The MPU 60 controls the operation of writing the data to the disk DK and selects a storage destination of the write data transferred from the host 100. In addition, the MPU 60 controls the operation of reading the data from the disk DK and controls the processing of the read data transferred from the disk DK to the host 100. The MPU 60 is connected to each of units of the magnetic disk device 1. The MPU 60 is electrically connected to, for example, the driver IC 120, the R/W channel 140, the HDC 150 and the like.

The MPU 60 comprises a read/write processing unit 61, an error correction unit 64, an adjustment unit 65, a correction limit prediction unit 66, a determination unit 67, a management unit 68, and the like. The MPU 60 executes the processing of each of these units, for example, the read/write processing unit 61, the error correction unit 64, the adjustment unit 65, the correction limit prediction unit 66, the determination unit 67, and the management unit 68, and the like on firmware. Incidentally, the MPU 60 may comprise each of these units as a circuit.

The read/write processing unit 61 includes a write processing unit 62 and a read processing unit 63. In accordance with commands from the host 100, the write processing unit 62 controls the data write processing, and the read processing unit 63 controls the data read processing, causing the read head RHD to execute reading the data from the disk DK. The read processing unit 63 is capable of executing seek processing to cause the read head RHD to seek. The write processing unit 62 is capable of executing write processing to write data to the recording layer of the disk DK. The read/write processing unit 61 controls the VCM 24 via the driver IC 120, positions the head HD at a target position (predetermined radial position) on the disk DK, and executes the read processing or the write processing.

FIG. 2 is a perspective view showing parts of the magnetic disk device 1, illustrating a plurality of disks DK and a plurality of heads HD.

As shown in FIG. 2, the direction of rotation of the disks DK in the circumferential direction is referred to as a rotational direction d3. Incidentally, in the example shown in FIG. 2, the rotational direction d3 is illustrated as a counterclockwise direction, but may be an opposite (clockwise) direction. In addition, a traveling direction d2 of the heads HD relative to the disks DK is opposite to the rotational direction d3. The traveling direction d2 is the direction in which the heads HD sequentially write the data to and read data from the disks DK in the circumferential direction, i.e., the direction in which the heads HD travel with respect to the disks DK in the circumferential direction.

The magnetic disk device 1 comprises i disks, from disk DK1 through disk DKi, and j heads, from head HD1 through head HDj. In the embodiment, the number of heads HD is twice the number of disks DK (j=2×i).

The disks DK1 through DKi are provided coaxially to overlap with each other at intervals. The diameters of the disks DK1 to DKi are the same as each other. The terms "same", "equal", "matching", "equivalent" and the like imply not only the meaning of being exactly the same, but also the meaning of being different to the extent that they can be regarded as substantially the same. Incidentally, the diameters of the disks DK1 to DKi may be different from each other.

Each disk DK has recording layers L on both sides. For example, the disk DK1 has a first recording layer La1 and a second recording layer Lb1 on the side opposite to the first recording layer La1. The disk DK2 has a first recording layer La2 and a second recording layer Lb2 on the side opposite to the first recording layer La2. The disk DKi has a first recording layer Lai and a second recording layer Lbi on the side opposite to the first recording layer Lai. Each first recording layer La may be referred to as a top surface or a recording surface. Each second recording layer Lb may be referred to as a back surface or recording surface.

However, each first recording layer La may be referred to as a back surface. In this case, each second recording layer Lb may be referred to as a top surface.

Each recording layer L has a user data area U and a system area S. The first recording layer La1 has a user data area Ua1 and a system area Sa1. The second recording layer Lb1 has a user data area Ub1 and a system area Sb1. The first recording layer La2 has a user data area Ua2 and a system area Sa2. The second recording layer Lb2 has a user data area Ub2 and a system area Sb2. The first recording layer Lai has a user data area Uai and a system area Sai. The second recording layer Lbi has a user data area Ubi and a system area Sbi.

A track sandwiched between double dashed lines in the figure, in the user data area Ua1 (first recording layer La1), is referred to as a track Ta1. A track located on a side opposite to the track Ta1, in the user data area Ub1 (second recording layer Lb1), is referred to as a track Tb1.

A track sandwiched between double dashed lines in the figure, in the user data area Ua2 (first recording layer La2), is referred to as a track Tc1. A track located on a side opposite to the track Tc1, in the user data area Ub2 (second recording layer Lb2), is referred to as a track Td1.

A track sandwiched between double dashed lines in the figure, in the user data area Uai (first recording layer Lai), is referred to as a track Te1. A track located on a side opposite to the track Te1, in the user data area Ubi (second recording layer Lbi), is referred to as a track Tf1.

In the embodiment, the tracks Ta1, Tb1, Tc1, Td1, Te1, and Tf1 are located on the same cylinder.

The heads HD are opposed to the disks DK. In the embodiment, one head HD is opposed to each recording layer L of the disk DK. For example, the head HD1 is opposed to the first recording layer La1 of the disk DK1, writes the data to the first recording layer La1, and reads the data from the first recording layer La1. The head HD2 is opposed to the second recording layer Lb1 of the disk DK1, writes the data to the second recording layer Lb1, and reads the data from the second recording layer Lb1.

The head HD3 is opposed to the first recording layer La2 of the disk DK2, writes the data to the first recording layer La2, and reads the data from the first recording layer La2. The head HD4 is opposed to the second recording layer Lb2 of the disk DK2, writes the data to the second recording layer Lb2, and reads the data from the second recording layer Lb2. The head HDj-1 is opposed to the first recording layer Lai of the disk DKi, writes the data to the first recording layer Lai, and reads the data from the first recording layer Lai. The head HDj is opposed to the second recording layer Lbi of the disk DKi, writes the data to the second recording layer Lbi, and reads the data from the second recording layer Lbi.

Figure 3:
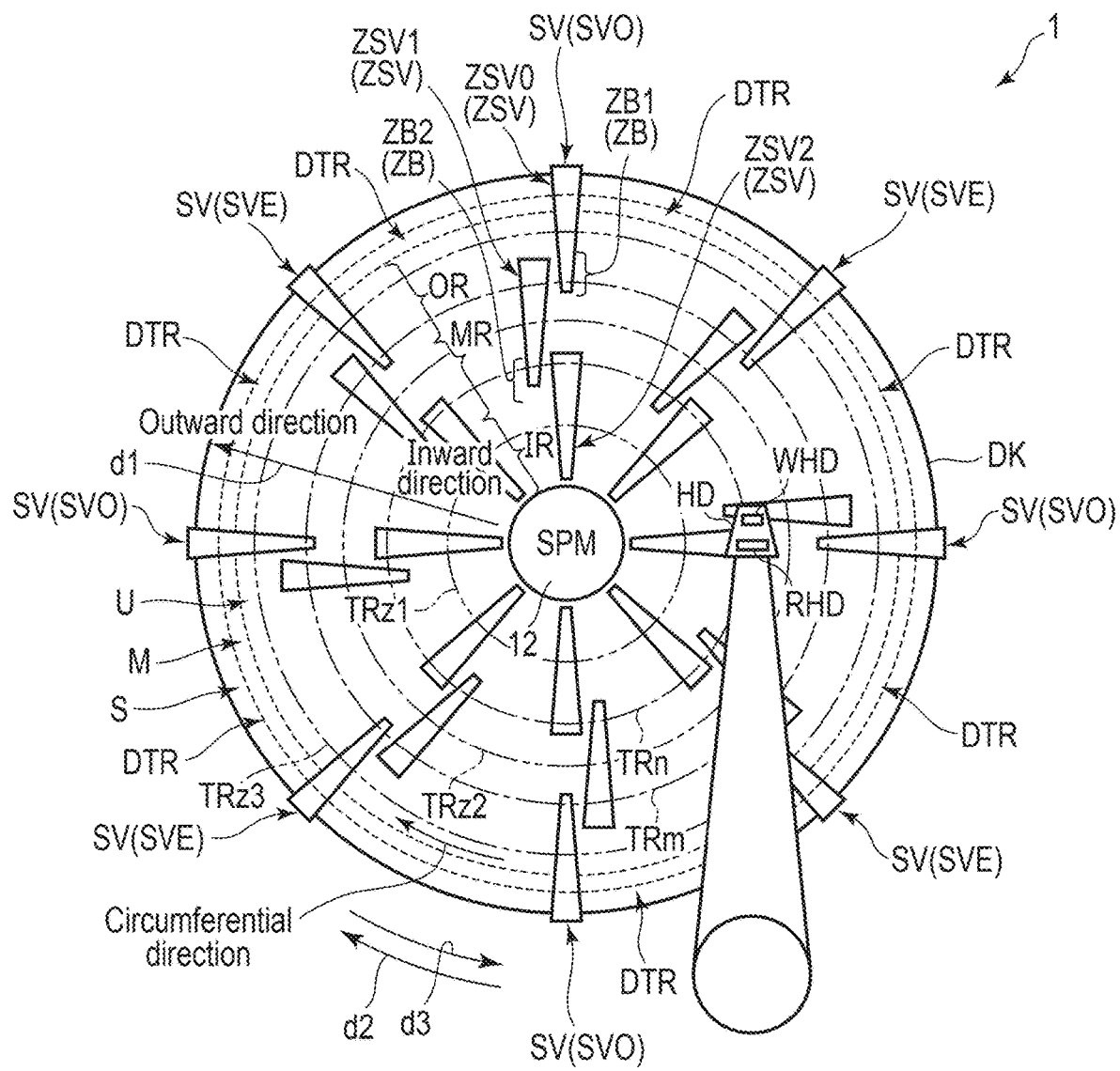
FIG. 3 is a schematic diagram showing an example of arrangement of a plurality of servo areas and a plurality of data areas on a single disk according to the embodiment.

FIG. 3 is a schematic diagram showing an example of arrangement of a plurality of servo areas SV and a plurality of data areas DTR on the single disk DK according to the embodiment. As shown in FIG. 3, a direction toward the outer circumference of the disk DK in the radial direction d1 of the disk DK is referred to as an outward direction (outside), and a direction opposite to the outward direction is referred to as an inward direction (inside).

In FIG. 3, the user data area U is divided into an inner circumferential area IR located in the inward direction, an outer circumferential area OR located in the outward direction, and an intermediate circumferential area MR located between the inner circumferential area IR and the outer circumferential area OR.

The disk DK has a plurality of servo areas SV and a plurality of data areas DTR. For example, the plurality of servo areas SV may extend radially in the radial direction of the disk DK and may be discretely arranged at predetermined intervals in the circumferential direction. For example, the plurality of servo areas SV may extend linearly from the inner circumference to the outer circumference and may be discretely arranged at predetermined intervals in the circumferential direction. For example, the plurality of servo areas SV may extend in a spiral shape from the inner circumference to the outer circumference and may be discretely arranged at predetermined intervals in the circumferential direction. Alternatively, for example, the plurality of servo areas SV may be arranged in a form of islands in the radial direction and may be discretely arranged at different predetermined intervals in the circumferential direction.

In the following descriptions, one servo area SV on a particular track is often referred to as a "servo sector". Incidentally, the "servo area SV" may be referred to as a "servo sector SV". The servo sector includes servo data. The "arrangement of several servo data elements constituting the servo sector, and the like" may be hereinafter referred to as a "servo pattern". Incidentally, the "servo data written in the servo sector" may be often referred to as the "servo sector".

Each of a plurality of data areas DTR is arranged between a plurality of servo areas SV. For example, the data area DTR corresponds to the area between two continuous servo areas SV in the circumferential direction. One data area DTR on a predetermined track may be hereinafter referred to as the "data sector". Incidentally, the "data area DTR" may be referred to as a "data sector DTR". The data sector includes user data. Incidentally, the "user data written to the data sector" may be referred to as the "data sector". The "data sector" may be referred to as the "user data". In addition, "a pattern composed of several data elements" may be referred to as a "data pattern". In the example shown in FIG. 3, the data pattern of a predetermined track is composed of a plurality of servo data elements (servo sectors) and a plurality of user data elements (data sectors).

The servo area SV includes a plurality of zone servo areas ZSV and the like. Incidentally, the servo area SV may include an area including a gap (i.e., a gap between circumferential positions of two zone servo areas), an area including the servo data, the data area DTR, and the like, in addition to the zone servo areas ZSV. The plurality of zone servo areas ZSV are discretely arranged in the radial direction d1. Each of the plurality of zone servo areas ZSV extends in the radial direction d1.

One zone servo area (servo area) ZSV on a predetermined track may be referred to as a "zone servo sector" or a "servo sector". Incidentally, the "zone servo area (servo area) ZSV" may be referred to as a "zone servo sector ZSV" or a "servo sector ZSV". The "servo data written to the zone servo sector" may be referred to as a "zone servo sector" or a "servo sector". The "arrangement of several servo data elements constituting the zone servo sector, and the like" may also be hereinafter referred to as a "zone servo pattern" or a "servo pattern". One servo area SV on a predetermined track may also be hereinafter referred to as a "zone pattern sector".

Incidentally, the "servo area SV" may be referred to as the "zone pattern sector". The "at least one data element and the like written to the zone pattern sector" may be referred to as the "zone pattern sector". The zone pattern sector includes at least one zone servo sector. The "data pattern of the zone pattern sector" may be hereinafter referred to as a "zone data pattern".

In the example shown in FIG. 3, the servo areas SV include zone servo areas ZSV0, ZSV1, and ZSV2. The zone servo areas ZSV0, ZSV1, and ZSV2 are arranged in a staggered pattern in the radial direction. The zone servo areas ZSV0, ZSV1, and ZSV2 may be arranged in a staircase pattern in the radial direction.

The zone servo area ZSV2 is located on an inner circumferential side than the zone servo area ZSV1. The zone servo area ZSV0 is located on an outer circumferential side than the zone servo area ZSV1. For example, the zone servo area ZSV2 is arranged to extend from the inner circumferential area IR to the intermediate circumferential area MR, the zone servo area ZSV1 is arranged to extend from the inner circumferential area IR to the outer circumferential area OR, and the zone servo area ZSV0 is arranged to extend from the intermediate circumferential area MR to the outer circumferential area OR. In the following descriptions, a predetermined radial area in which the plurality of zone servo areas ZSV are arranged in the circumferential direction, in a predetermined servo area SV, may be referred to as a zone servo boundary area, double servo area, or double zone servo area ZB.

In the example shown in FIG. 3, the main servo areas SVO and the sub-servo areas SVE are alternately arranged at intervals in the circumferential direction. For example, one sub-servo area SVE is arranged between two main servo areas SVO that are continuously aligned at an interval in the circumferential direction. In other words, one sub-servo area SVE is arranged between two main servo areas SVO that are continuously aligned at an interval in the circumferential direction. For example, when sequentially continuous numbers are assigned to all the servo areas SV of the disk DK, the main servo areas SVO correspond to the odd-numbered servo areas SV, and the sub-servo areas SVE correspond to the even-numbered servo areas SV. Incidentally, two or more sub-servo areas SVE may be arranged between two main servo areas SVO that are continuously arranged at an interval, in the circumferential direction.

The main servo areas SVO and the sub-servo areas SVE may be composed of, for example, only servo areas where the servo data is read and demodulated as a whole (hereinafter often referred to as normal servo areas). In the following descriptions, "reading and demodulating the servo data" may be referred to as "servo-reading". The main servo areas SVO and the sub-servo areas SVE may be composed of, for example, the normal servo areas, and servo areas (hereinafter often referred to as short servo areas) where servo-reading is executed in a smaller circumferential range of the servo data than a circumferential range of the servo data which is servo-read in the normal servo areas.

A media cache M is allocated to the disk DK. However, the media cache M may not be arranged on the disk DK.

By using the above-described plurality of servo data elements, for example, the positioning error of the head HD (for example, the write head WHD) can be derived.

In the embodiment, it has been described that the number of zones of the disk DK is three, but the number of zones of the disk DK can be variously changed. The number of zones of the disk DK may be thirty to forty. In addition, each zone includes a plurality of bands. For example, each zone includes several hundreds of bands.

Figure 4:
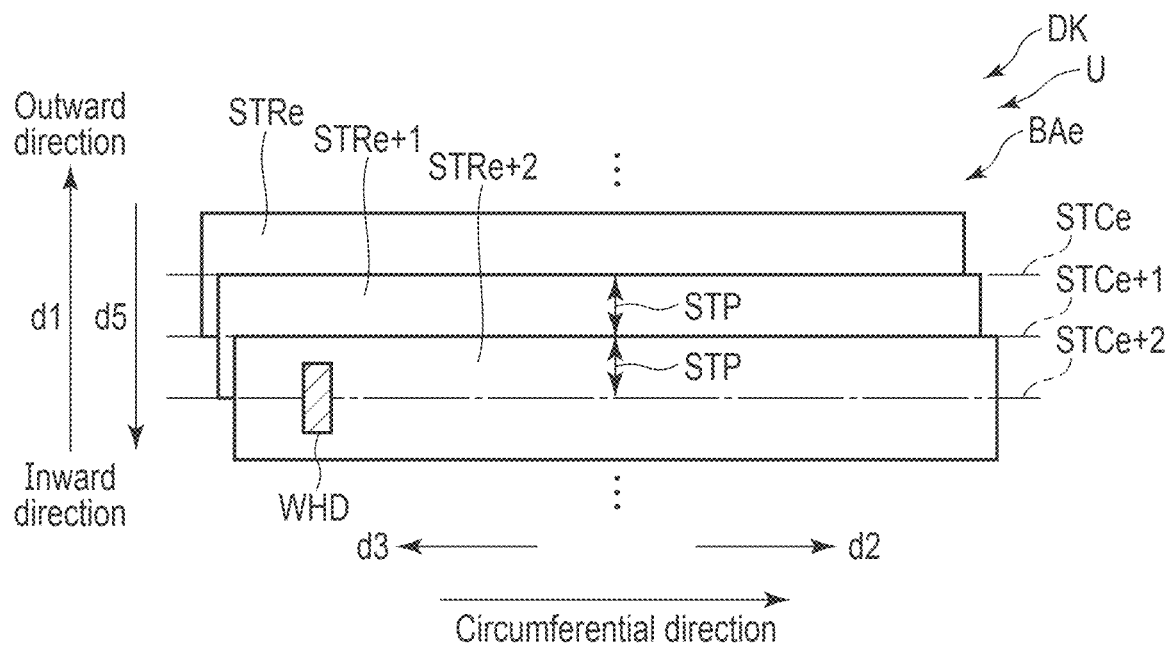
FIG. 4 is a schematic diagram showing three tracks in the user data area where shingled magnetic recording processing of the disk shown in FIG. 3 is executed, together with a write head.

FIG. 4 is a schematic diagram showing three tracks STR of the user data area U where the shingled magnetic recording processing is executed for the disk DK shown in FIG. 3, and the write head WHD. The user data area U is a shingled magnetic recording area. Sequentially writing the data in band units in the user data area U is permitted, i.e., shingled magnetic recording is permitted.

As shown in FIG. 4, the write head WHD can sequentially write the data to the disk DK in the traveling direction d2. The read head RHD shown in FIG. 3 can also sequentially read the data written to the disk DK in the traveling direction d2.

In the direction parallel to the radial direction d1, the direction of sequentially executing the shingled magnetic recording for a plurality of tracks STR that are a plurality of data tracks, i.e., the direction of making a track STR to which the data is be next written overlap with a track STR to which the data has been previously written, in the radial direction d1, is referred to as an overwrite direction or a recording progress direction. In a band BAe shown in FIG. 4, an overwrite direction d5 is an inward direction, but the overwrite direction may be an outward direction.

For example, an overwrite direction applied to a plurality of bands BA (a plurality of zones Z) located on an outer circumference side than a specific radial position and an overwrite direction applied to a plurality of bands BA (a plurality of zones Z) located on an inner circumferential side than the specific radial position may be opposite to each other.

The band BAe includes a plurality of tracks STR including tracks STRe, STRe+1, and STRe+2. The tracks STRe, STRe+1, and STRe+2 are sequentially overwritten in the overwrite direction d5 in the order described above. The track STRe among the tracks STRe, STRe+1, and STRe+2 corresponds to the track where data is first written, and the track STRe+2 corresponds to the track where data is last written.

The track STRe has a track center STCe at the center of the radial direction d1 when no other tracks are overwritten. The track STRe+1 has a track center STCe+1 at the center of the radial direction d1 when no other tracks are overwritten. The track STRe+2 has a track center STCe+2 at the center of the radial direction d1 when no other tracks are overwritten.

In the example shown in FIG. 4, the data is written to the tracks STRe, STRe+1, and STRe+2 at a pitch (shingled magnetic recording track pitch) STP. The track center STCe of the track STRe and the track center STCe+1 of the track STRe+1 are separated from each other at a pitch STP in the radial direction d1. The track center STCe+1 of the track STRe+1 and the track center STCe+2 of the track STRe+2 are separated from each other at a pitch STP in the radial direction d1. The data may be written to the tracks STRe to STRe+2 at different pitches.

A width in the radial direction d1 of the area of the track STRe where the track STRe+1 is not overwritten and a width in the radial direction d1 of the area of the track STRe+1 where the track STRe+2 is not overwritten are the same as each other.

Incidentally, the width in the radial direction d1 of the area of the track STRe where the track STRe+1 is not overwritten and the width in the radial direction d1 of the area of the track STRe+1 where the track STRe+2 is not overwritten may be different from each other.

In FIG. 4, each track STR has a rectangular shape for convenience of descriptions but, in reality, each track STR is curved along the circumferential direction. In addition, each track STR may have a wave shape extending in the circumferential direction while varying in the radial direction d1. Incidentally, three tracks STR are overwritten in FIG. 4, but two tracks STR may be overwritten or more three tracks STR may be overwritten.

The write processing unit 62 can select the shingled magnetic recording system of overwriting the data on a plurality of tracks STR in the overwrite direction d5 and cause the write head WHD to write the data to each of the bands BA. In the example shown in FIG. 4, the write processing unit 62 sequentially executes the shingled magnetic recording of the tracks STRe to STRe+2 in the band BAe at the pitch STP in the inward direction (overwrite direction d5). Since the user data area U is the area where the data is written in the shingled magnetic recording, the recording density of the user data area U can be improved.

The write processing unit 62 writes the data to the track STRe+1 at the pitch STP in the inward direction of the track STRe and overwrites the track STRe+1 on an inner circumferential part of the track STRe. The write processing unit 62 writes the data to the track STRe+2 at the pitch STP in the inward direction of the track STRe+1 and overwrites the track STRe+2 on an inner circumferential part of the track STRe+1.

Figure 5:
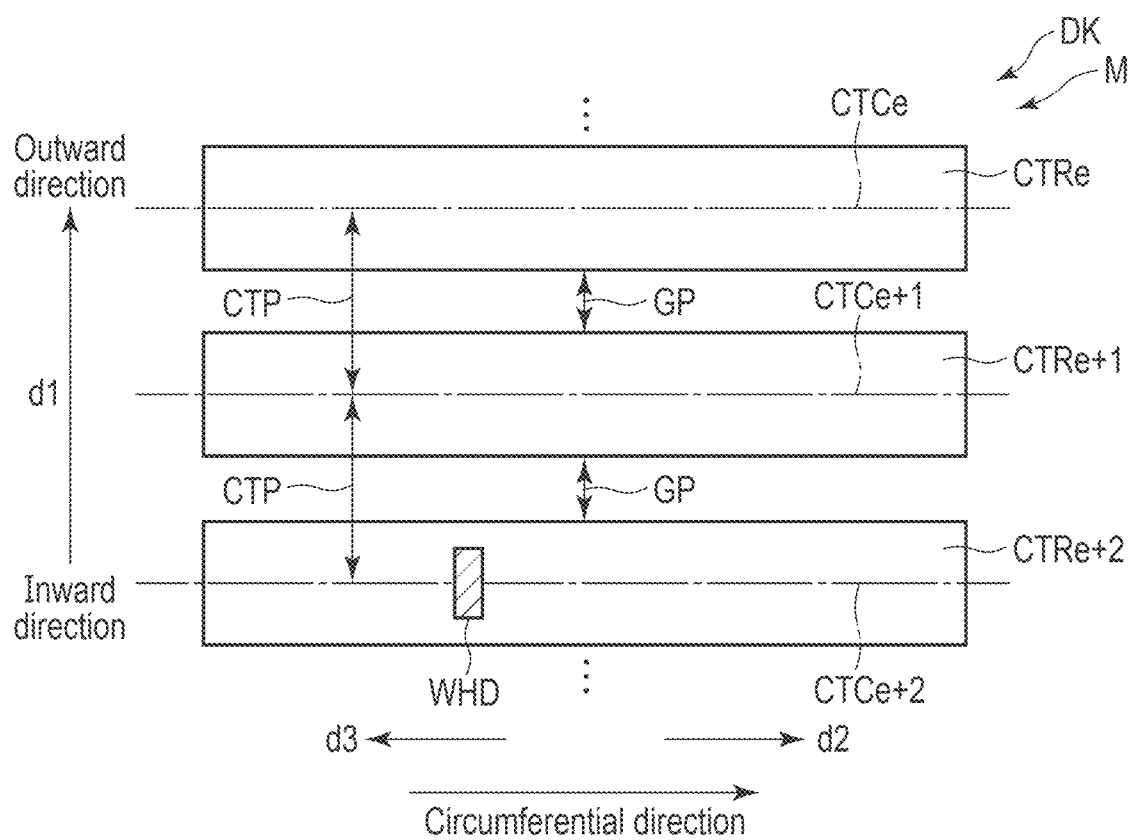
FIG. 5 is a schematic diagram showing three tracks of a media cache where conventional magnetic recording processing of the disk shown in FIG. 3 is executed, together with a write head.

FIG. 5 is a schematic diagram showing three tracks CTR of the media cache M where the conventional magnetic recording processing of the disk DK shown in FIG. 3 is executed, and the write head WHD. The media cache M and the system area S shown in FIG. 3 are the conventional magnetic recording areas. In the media cache M and the system area S, randomly writing the data is permitted, i.e., conventional magnetic recording is permitted.

As shown in FIG. 5, the media cache M includes a plurality of tracks CTR including tracks CTRe, CTRe+1, and CTRe+2. Each of a plurality of tracks CTR is a data track. For example, widths (track widths) in the radial direction d1 of the tracks CTRe, CTRe+1, and CTRe+2 are the same as each other. Incidentally, the track widths of the tracks CTRe to CTRe+2 may be different from each other.

The track CTRe has a track center CTCe at the center of the radial direction d1, the track CTRe+1 has a track center CTCe+1 at the center of the radial direction d1, and the track CTRe+2 has a track center CTCe+2 at the center of the radial direction d1. In the example shown in FIG. 5, the tracks CTRe, CTRe+1, and CTRe+2 are written at the pitch (conventional magnetic recording track pitch) CTP. The track center CTCe of the track CTRe and the track center CTCe+1 of the track CTRe+1 are separated from each other at the pitch CTP. The track center CTCe+1 of the track CTRe+1 and the track center CTCe+2 of the track CTRe+2 are separated from each other at the pitch CTP.

The track CTRe and the track CTRe+1 are separated from each other at a gap GP. The track CTRe+1 and the track CTRe+2 are separated from each other at the gap GP. Incidentally, the data may be written to the tracks CTRe to CTRe+2 at different pitches. In FIG. 5, each track CTR has a rectangular shape for convenience of descriptions but, in reality, each track CTR is curved along the circumferential direction. In addition, each track CTR may have a wave shape extending in the circumferential direction while varying in the radial direction d1.

The write processing unit 62 can execute the write processing by selecting the conventional magnetic recording of writing the data to a plurality of tracks CTR spaced apart in the radial direction d1 of the disk DK. In the example shown in FIG. 5, the write processing unit 62 positions the write head WHD at the track center CTCe in a predetermined area of the disk DK and executes the conventional magnetic recording in a predetermined sector of the track CTRe or the track CTRe.

The write processing unit 62 positions the write head WHD at the track center CTCe+1, which is separated from the track center CTCe of the track CTRe in the inward direction by the pitch CTP, and executes the conventional magnetic recording in a predetermined sector of the track CTRe+1 or the track CTRe+1. The write processing unit 62 positions the write head WHD at the track center CTCe+2, which is separated from the track center CTCe+1 of the track CTRe+1 in the inward direction by the pitch CTP, and executes the conventional magnetic recording in a predetermined sector of the track CTRe+2 or the track CTRe+2.

The write processing unit 62 may sequentially execute the conventional magnetic recording in the tracks CTRe, CTRe+1, and CTRe+2, in a predetermined area of the disk DK, or randomly execute the conventional magnetic recording in a predetermined sector of the track CTRe, a predetermined sector of the track CTRe+1, and a predetermined sector of the track CTRe+2.

Figure 6:
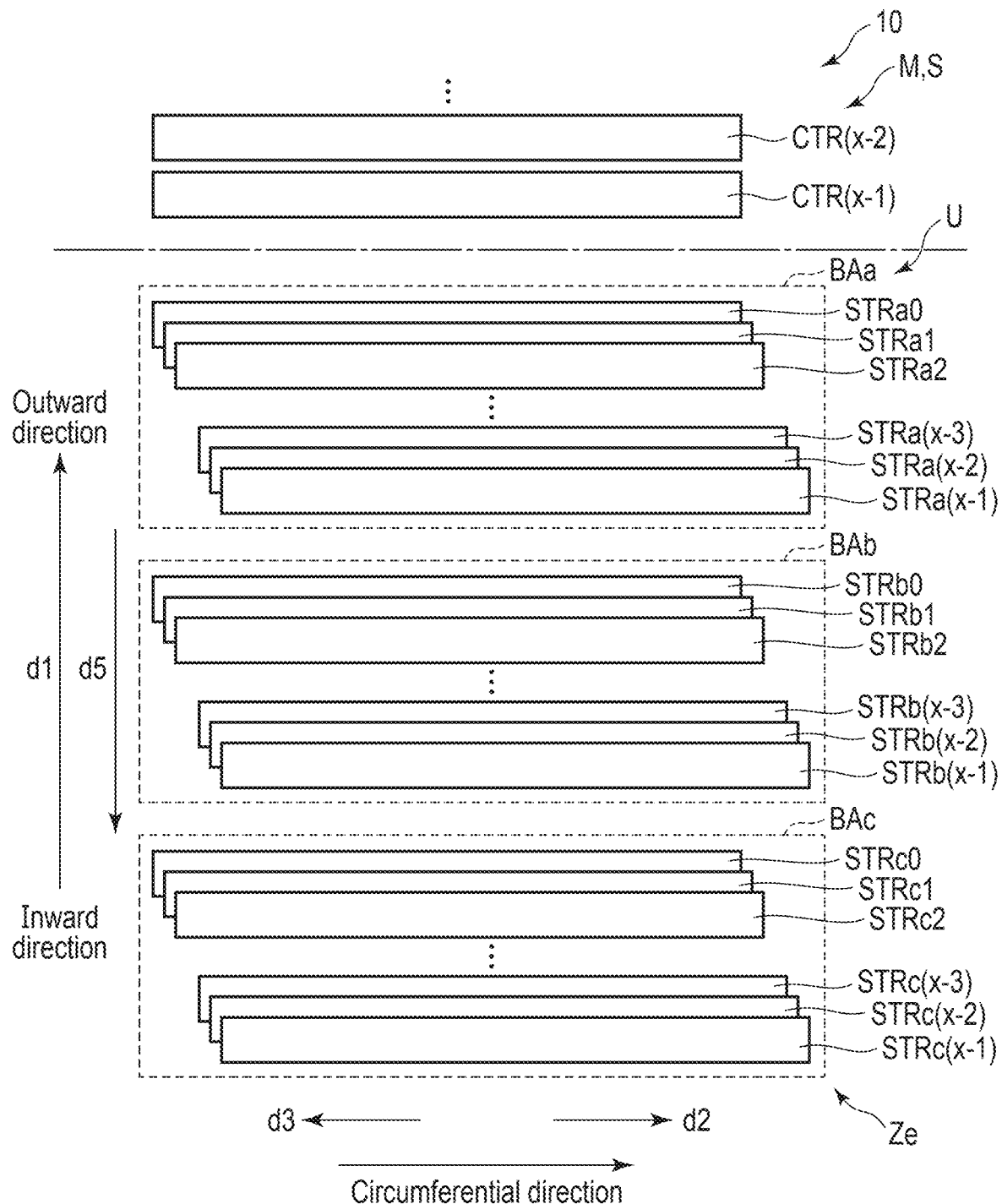
FIG. 6 is a schematic diagram showing an example of data write processing on the disk.

FIG. 6 is a schematic diagram showing an example of the data write processing on the disk DK. Each of the tracks STR and CTR is a data track. As shown in FIG. 6, the user data area U includes bands BAa, BAb, and BAc. The bands BAa, BAb, and BAc belong to the same zone Ze. In the zone Ze, the bands BAa, BAb, and BAc are intermittently arranged in the overwrite direction in the order of these descriptions.

The bands BAa and BAb are adjacent to each other in the radial direction d1, and the bands BAb and BAc are adjacent to each other in the radial direction d1.

The band BAa includes x tracks such as tracks STRa0, STRa1, STRa2, ..., STRa(x-3), STRa(x-2), and STRa(x-1). The tracks STRa0 to STRa(x-1) are subjected to the shingled magnetic recording in the overwrite direction d5 in the order of these descriptions. In the band BAa, the track STRa0 corresponds to a first track where the data is first written, and the track STRa(x-1) corresponds to the last track where the data is last written.

The band BAb includes x tracks such as tracks STRb0, STRb1, STRb2, ..., STRb(x-3), STRb(x-2), and STRb(x-1). The tracks STRb0 to STRb(x-1) are subjected to the shingled magnetic recording in the overwrite direction d5 in the order of these descriptions. In the band BAb, the track STRb0 corresponds to a first track where the data is first written, and the track STRb(x-1) corresponds to the last track where the data is last written.

The band BAc includes x tracks such as tracks STRc0, STRc1, STRc2, ..., STRc(x-3), STRc(x-2), and STRc(x-1). The tracks STRC0 to STRc(x-1) are subjected to the shingled magnetic recording in the overwrite direction d5 in the order of these descriptions. In the band BAc, the track STRc0 corresponds to a first track where the data is first written, and the track STRc(x-1) corresponds to the last track where the data is last written.

The number of the tracks STR included in each of the bands BA belonging to the same zone Z is the same. For example, the number of the tracks STR included in each of the bands BA belonging to the zone Ze is the same. In other words, the number of the tracks STR included in the band BA is fixed for each zone Z. In this example, the number of tracks STR in each of the bands BA belonging to the zone Ze is x.

FIG. 6 shows tracks CTR(x-2) and CTR(x-1). In FIG. 6, the tracks CTR(x-2) and CTR(x-1) are subjected to the conventional magnetic recording in the media cache M or the system area S. The tracks CTR(x-2) and CTR(x-1) are adjacent to each other in the radial direction d1.

FIG. 7 is a schematic diagram showing two bands BAa and BAb and one guard band GB of the user data area U shown in FIG. 6. As shown in FIG. 7, in the shingled magnetic recording, unlike the conventional magnetic recording, the MPU 60 manages a track group of the user data area U in units referred to as bands, with the feature of overwriting the data to a part of the track STR.

A guard band GB is generally provided between adjacent bands BA in the radial direction d1. The guard band GB includes a guard track GTR. Unlike the embodiment, the guard band GB may include a plurality of guard tracks GTR. The guard band GB has a role of suppressing the interference between the adjacent bands BA. The shingled magnetic recording can be executed in a unit of one band BA by the guard band GB. In addition, the ranges (bands BA) where the data is sequentially written can be separated by the guard band GB.

For example, the track center STCa(x-3) of the track STRa(x-3), the track center STCa(x-2) of the track STRa(x-2), the track center STCa(x-1) of the track STRa(x-1), the track center GTC of the guard track GTR, the track center STCb0 of the track STRb0, the track center STCb1 of the track STRb1, and the track center STCb2 of the track STRb2, are located at equal pitch in the overwrite direction d5.

The recording capacity of each band BA in the user data area U is usually predetermined based on the specifications required by the user except for the guard band GB. The MPU 60 can record the same capacity of data in each of the bands BA. In general, the recording capacity of each band BA is 128 MiB or 256 MiB.

FIG. 8 is a schematic diagram showing three sectors SCe, SC(e+1), and SC(e+2) of one track STRa0 of the band BAa shown in FIG. 6. As shown in FIG. 8, each track STR includes a plurality of sectors SC. The track STRa1 includes a plurality of sectors SC including sectors SCe, SC(e+1), and SC(e+2).

If the sector SC(e+1) is the n-th sector among the plurality of sectors SC of the track STRa0, then the sector SC(e+2) is the n+1-th sector following the sector SC(e+1) in the traveling direction d2, and the sector SCe is the n-1-th sector located in front of the sector SC(e+1) in the traveling direction d2. The number of the sectors SC included in each of the tracks STR belonging to the same zone Z is the same. In the embodiment, the number of sectors SC included in each of the tracks STR belonging to the zone Ze is y.

Each of the sectors SC has a length Ls in the circumferential direction of the disk DK. Each sector SC may be a split sector that is divided by the servo sector SV. In this case, the length of the sector SC does not need to be Ls.

The write head WHD is a magnetic head for energy-assisted recording that executes energy assisted magnetic recording (EAMR). In the embodiment, the write head WHD is configured to use energy other than the magnetic energy, but the write head WHD may also be a magnetic head that is not configured to execute the energy assisted magnetic recording.

Figure 9:
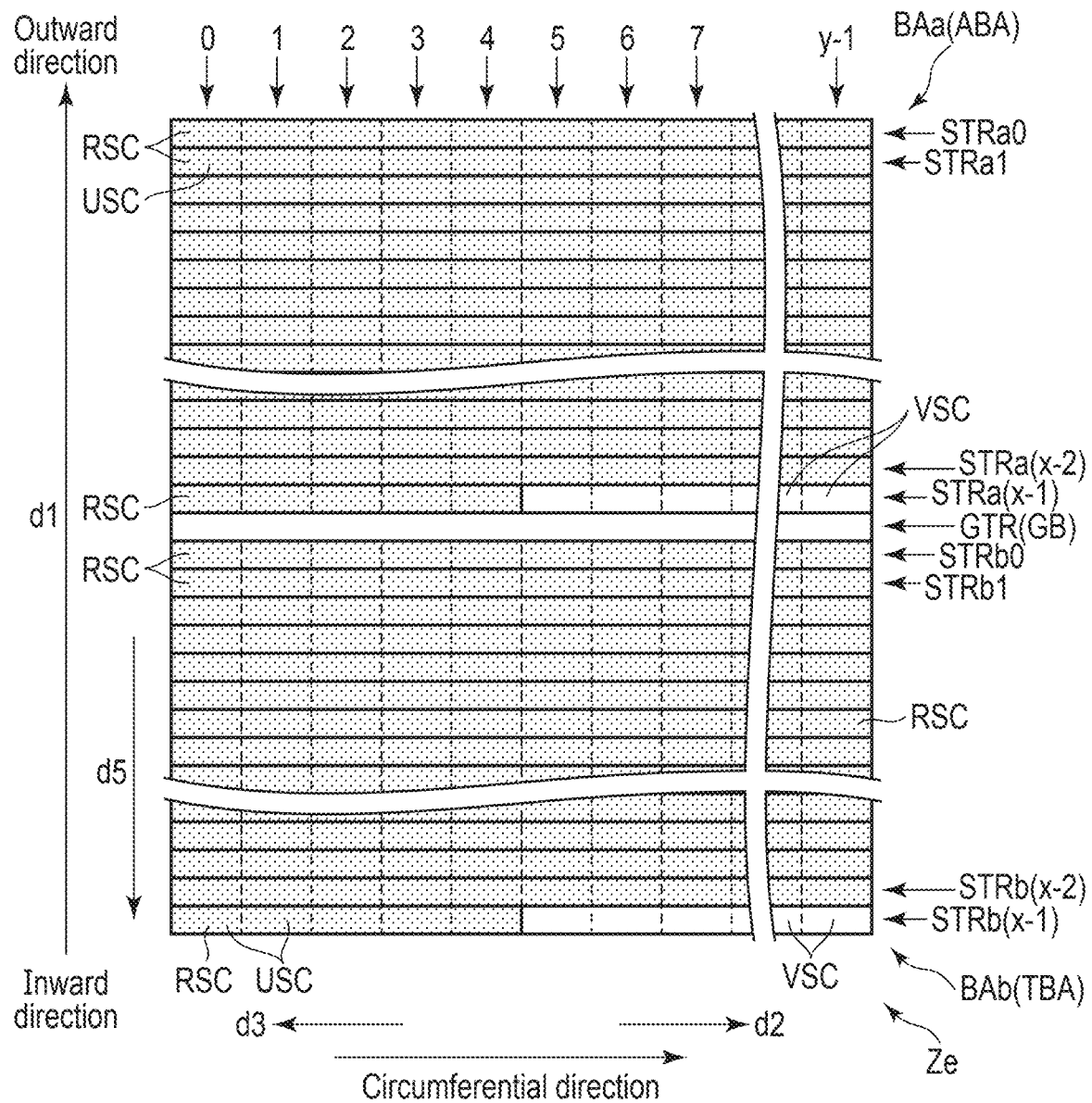
FIG. 9 is a schematic diagram showing two bands and one guard band shown in FIG. 7, illustrating a plurality of target sectors and a plurality of unused sectors.

FIG. 9 is a schematic diagram showing the two bands BAa and BAb and one guard band GB shown in FIG. 7, illustrating the plurality of target sectors RSC and the plurality of unused sectors VSC.

In FIG. 9, each track STR has a rectangular shape for convenience of description but, in reality, each track STR is curved along the circumferential direction. In addition, a plurality of tracks STR are aligned in the overwrite direction d5 without overlapping but, in reality, the plurality of tracks STR are aligned in the overwrite direction d5 while overlapping. In the figure, the target sector RSC is marked with a dot pattern. Unused sectors VSC are represented by a solid color.

As shown in FIG. 9, the band number of the band BAa is "a" and the band number of the band BAb is "b". The track numbers of the respective bands BA are set to "0" to "x−1". The sector numbers of the respective tracks STR are set to "0" to "y−1". In the following descriptions, the sector SC of each band BA may be identified by the following code "SC (track number, sector number)".

In the embodiment, the band BAa is a band adjacent to a band BAb, and is a band located above the band BAb in the overwrite direction d5.

Each track STR of the band BAa includes G target sectors RSC (one or more target sectors RSC) on which valid data is written. For example, the track STRa0 includes y target sectors RSC (G=y). All the sectors SC of the track STRa0 are the target sectors RSC. The track STRa(x−1) includes five target sectors RSC (G=5). The remaining sectors SC of the track STRa(x−1) are unused sectors VSC where valid data is not written.

Based on the above, the number of target sectors RSC on the track STRa0 is different from the number of target sectors RSC on the track STRa(x−1).

In each of the bands BA of the zone Ze, all the sectors SC of x−1 tracks STR from number 0 to number x−2 are the target sectors RSC where valid data is written, and are the recorded sectors USC. On the x−1-th track STR of each band BA of the zone Ze, five sectors SC from number 0 to number 4 are the target sectors RSC, and are the recorded sectors USC. In contrast, on the x−1-th track STR, remaining sectors SC from number 5 to number y−1 are the unused sectors VSC where valid data is not written.

Figure 10:
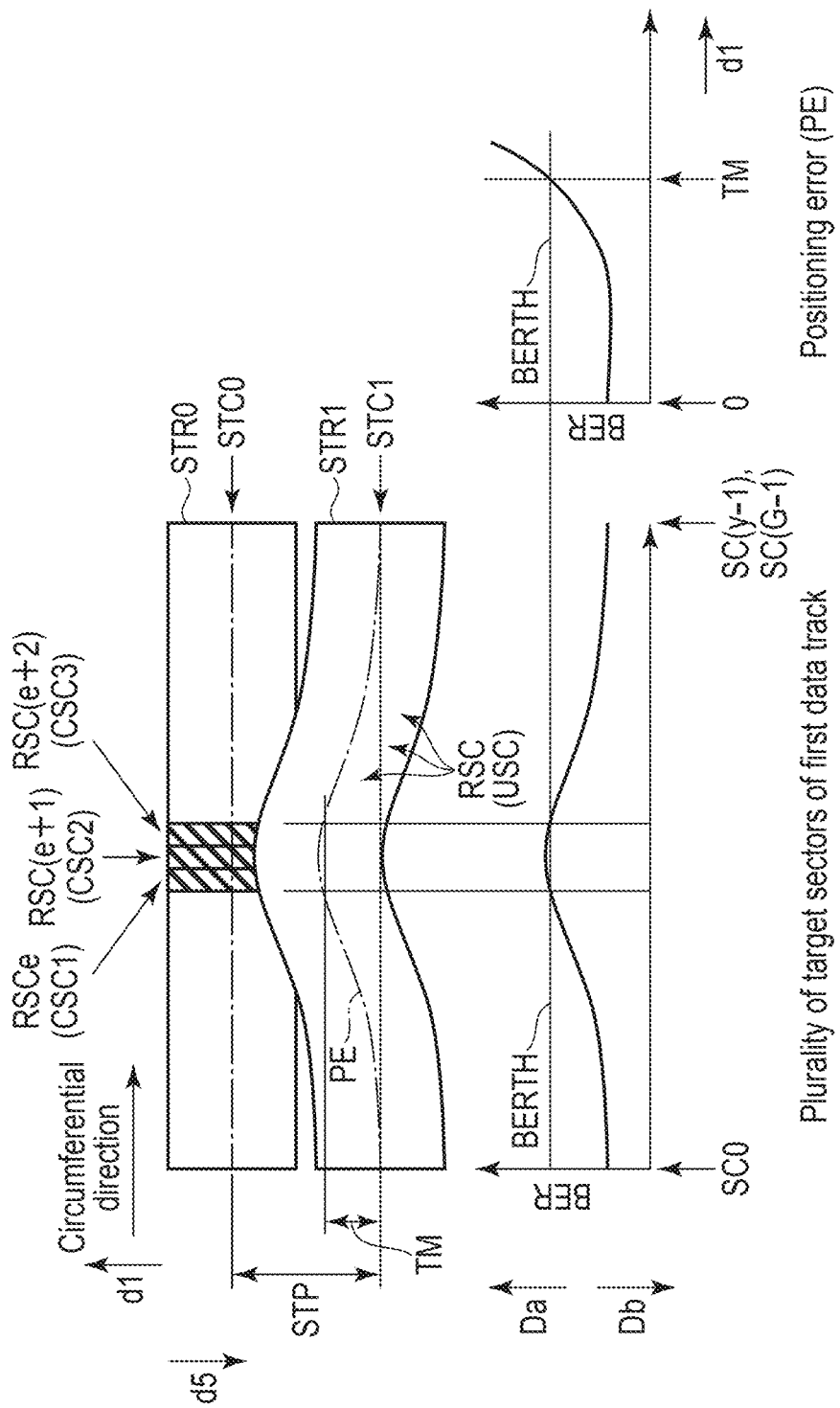
FIG. 10 is a schematic diagram showing an example of the first track and the second track in a case where it is assumed that the above-described magnetic disk device does not comprise a function of executing track-based error correction for track data, illustrating the write processing for the first track and the second track, illustrating a state in which the write processing for the second track is continued until the sector-based error correction for the first track reaches its limit, and illustrating each of the change in BER for the first track and the change in BER for the positioning error in graph form.

FIG. 10 is a schematic diagram showing an example of the first track STR0 and the second track STR1 in a case where it is assumed that the magnetic disk device 1 does not comprise a function of executing the error correction of the data on the track TR, illustrating the write processing for the first track STR0 and the second track STR1, illustrating a state in which the write processing for the second track STR1 is continued until the error correction in each sector for the first track STR0 reaches its limit, and illustrating each of the change in a bit error rate (BER) for the first track STR0 and the change in BER for the positioning error in graph form. In the descriptions made with reference to FIG. 10, it is assumed that the magnetic disk device 1 does not comprise the error correction unit 64 shown in FIG. 1. In addition, in FIG. 10 as well, the first track STR0 and the like are drawn by assuming the circumferential direction to be linear, for convenience of descriptions.

As shown in FIG. 10, in the recording layer L, the plurality of tracks STR are adjacent in the radial direction d1. The first track STR0 and the second track STR1 are the data tracks adjacent to each other, and all sectors SC of the first track STR0 and all sectors (data sectors) SC of the second track STR1 are the target sectors RSC. The write processing for the first track STR0 is executed ideally without any positioning error PE (PE≈0 or PE=0).

If the magnetic disk device 1 is affected by external vibration or the like during the write processing, a positioning error PE occurs when positioning the write head WHD.

The positioning error PE is the amount of deviation from the target position of the write head WHD in the radial direction d1. By setting a track margin TM, the allowable range in which it is guaranteed that data on adjacent tracks can be read can be determined.

For example, if the write processing is executed on the second track STR1 and if the target sectors RSCe, RSC(e+1), and RSC(e+2) of the first track STR0 are adjacent to the write head WHD in the radial direction d1 during the period when the positioning error PE exceeds the track margin TM, it is determined (predicted) that the data in the target sectors RSCe, RSC(e+1), and RSC(e+2) of the first track STR0 are corrupted. Although a lower BER of the data is desirable, the BER of the data of the target sectors RSCe, RSC(e+1), and RSC(e+2) of the first track STR0 exceeds a threshold value BERTH. Incidentally, as understood from the graph on the right side of FIG. 10, as the positioning error PE becomes greater, the adverse effect of adjacent track interference (ATI) becomes greater and the BER of the data on the first track STR0, which is adversely affected by ATI, becomes excessively high.

For this reason, the target sectors RSCe, RSC(e+1), and RSC(e+2) among the plurality of target sectors RSC of the first track STR0 are determined to be corrupted target sectors CSC1, CSC2, and CSC3, respectively. This matter may lead to situations where the quality of the signals obtained by reading the data in the corrupted target sectors CSC1, CSC2, and CSC3 are deteriorated or the data in the corrupted target sectors CSC1, CSC2, and CSC3 is erased.

In the example described with reference to FIG. 10, the magnetic disk device 1 does not comprise a function of executing track-based error correction for the data on the track TR. In this case, track-based error correction is also referred to as track-based error correction, track error correction code (ECC), or the like. For this reason, the target sectors RSCe, RSC(e+1), and RSC(e+2) remain the corrupted target sectors CSC1, CSC2, and CSC3, respectively.

In FIG. 10, it has been described that all the target sectors RSC of the track TR have a common track margin TM. In the following descriptions of FIG. 11 and FIG. 12 as well, it will be explained that all the target sectors RSC of the track TR have a common track margin TM. However, the above-described setting of the track margin TM is just an example, and the track margin TM may be different for each target sector RSC.

Figure 11:
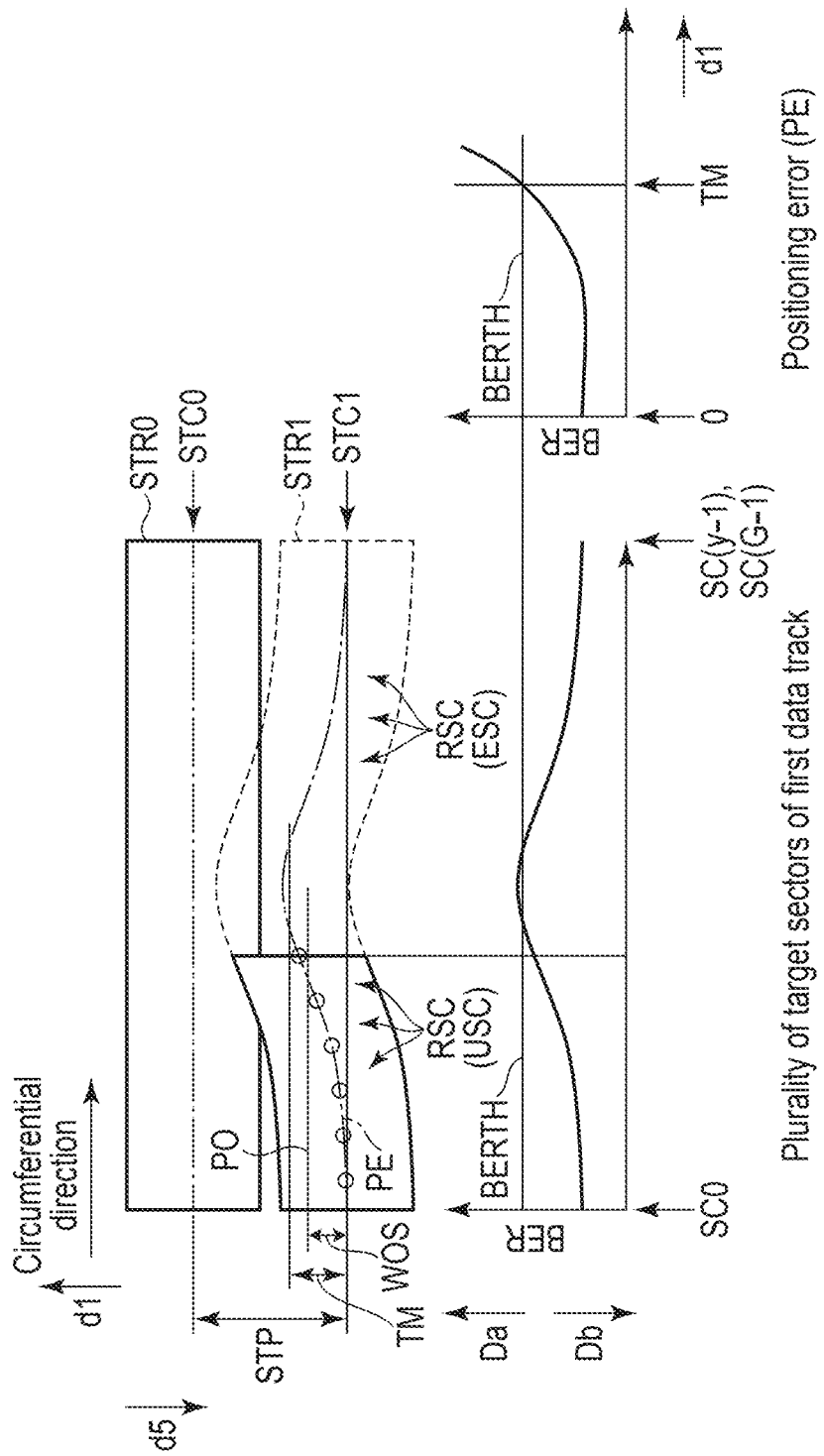
FIG. 11 is a schematic diagram showing an example of the first track and second track in a case where it is assumed that the magnetic disk device does not comprise a function of executing track-based error correction for the track data, illustrating the write processing for the first track and the second track, illustrating a state in which a determination value is set to a write-off track slice smaller (more severe) than the track margin and the write processing for the second track is ended when a positioning error exceeds a reference radius position, and illustrating each of the change in BER for the first track and the change in BER for the positioning error in graph form.

FIG. 11 is a schematic diagram showing an example of the first track STR0 and the second track STR1 in a case where it is assumed that the magnetic disk device 1 does not comprise a function of executing the track-based error correction for the data of the track TR, illustrating the write processing for the first track STR0 and the second track STR1, illustrating a state in which the write processing for the second track STR1 is ended when a determination value is set to a write-off track slice WOS smaller (more severe) than the track margin TM and it is detected that the positioning error PE exceeds a reference radius position PO, and illustrating each of the change in BER for the first track STR0 and the change in BER for the positioning error PE in graph form. In FIG. 11 as well, the first track STR0 and the like are drawn by assuming the circumferential direction to be linear, for convenience of descriptions. In the descriptions made with reference to FIG. 11, it is assumed that the magnetic disk device 1 does not comprise the error correction unit 64 shown in FIG. 1.

As shown in FIG. 11, the first track STR0 and the second track STR1 are the data tracks, and all the sectors SC of the first track STR0 and all the sectors (data sectors) SC of the second track STR1 are the target sectors RSC. The write processing for the first track STR0 is executed ideally without any positioning error PE (PE≈0 or PE=0). The first track STR0 is located in the first direction Da that is parallel to the radial direction d1 as seen from the second track STR1.

The write processing unit 62 can select the shingled magnetic recording of making the data of the second track STR1 overlap with the data of the first track STR0 in the overwrite direction d5 opposite to the first direction Da and writing the data.

In order to prevent or suppress the write processing in a state where the positioning error PE exceeds the track margin TM, the magnetic disk device 1 has a write-off track slice WOS. The reference radius position PO is a position offset by the write-off track slice WOS in the first direction Da from a track center STC1 of the second track STR1. When it is determined that the positioning error PE has exceeded the reference radius position PO during the period when the data is being written to the second track STR1, writing the data to the second track STR1 can be suspended. The remaining target sectors RSC for which data writing has been postponed, among the plurality of target sectors RSC of the second track STR1, become empty sectors ESC where no data is written. The occurrence of the corrupted target sectors CSC on the first track STR0 can be prevented by avoiding the situation in which the positioning error PE exceeds the track margin TM.

Incidentally, the track STR has a servo sector in addition to the sector SC that is the data sector. In the track STR, data sectors and servo sectors are generally arranged alternately. The head HD (read head RHD) can derive the positioning error PE together with the servo sector. Therefore, the positioning error PE is generally information which can be obtained intermittently.

In order to prevent PE from becoming greater than TM, the write-off track slice WOS needs to be set such that WOS≤TM. In order to avoid the situation where PE becomes greater than TM, it is desirable to set the write-off track slice WOS such that WOS<TM. Thus, the write processing for the second track STR1 can be suspended before the positioning error PE exceeds the track margin TM, and the situation in which the quality of the data on the first track STR0 is deteriorated can be avoided.

However, it needs to be noted that the write processing can be suspended more easily as the write-off track slice WOS is set to be smaller, which leads to a decrease in the write performance of the magnetic disk device 1. Incidentally, if the write processing for the second track STR1 is suspended, in the magnetic disk device 1 that does not comprise the function of executing the track-based error correction, write retry processing of resuming the write processing for the second track STR1 after awaiting the rotation of the disk DK until PE<WOS, is resumed. Since the empty sector ESC of the second track STR1 can be changed to a recorded sector USC, in the write retry processing, the situation in which the utilization efficiency of the second track STR1 remains low is avoided.

In FIG. 11, it has been described that all the target sectors RSC of the track TR have a common write-off track slice WOS. In the following descriptions of FIG. 12 as well, it will be described that all the target sectors RSC of the track TR have a common write-off track slice WOS. However, the above-described setting of the write-off track slice WOS is an example, and the write-off track slice WOS may be different for each target sector RSC.

Figure 12:
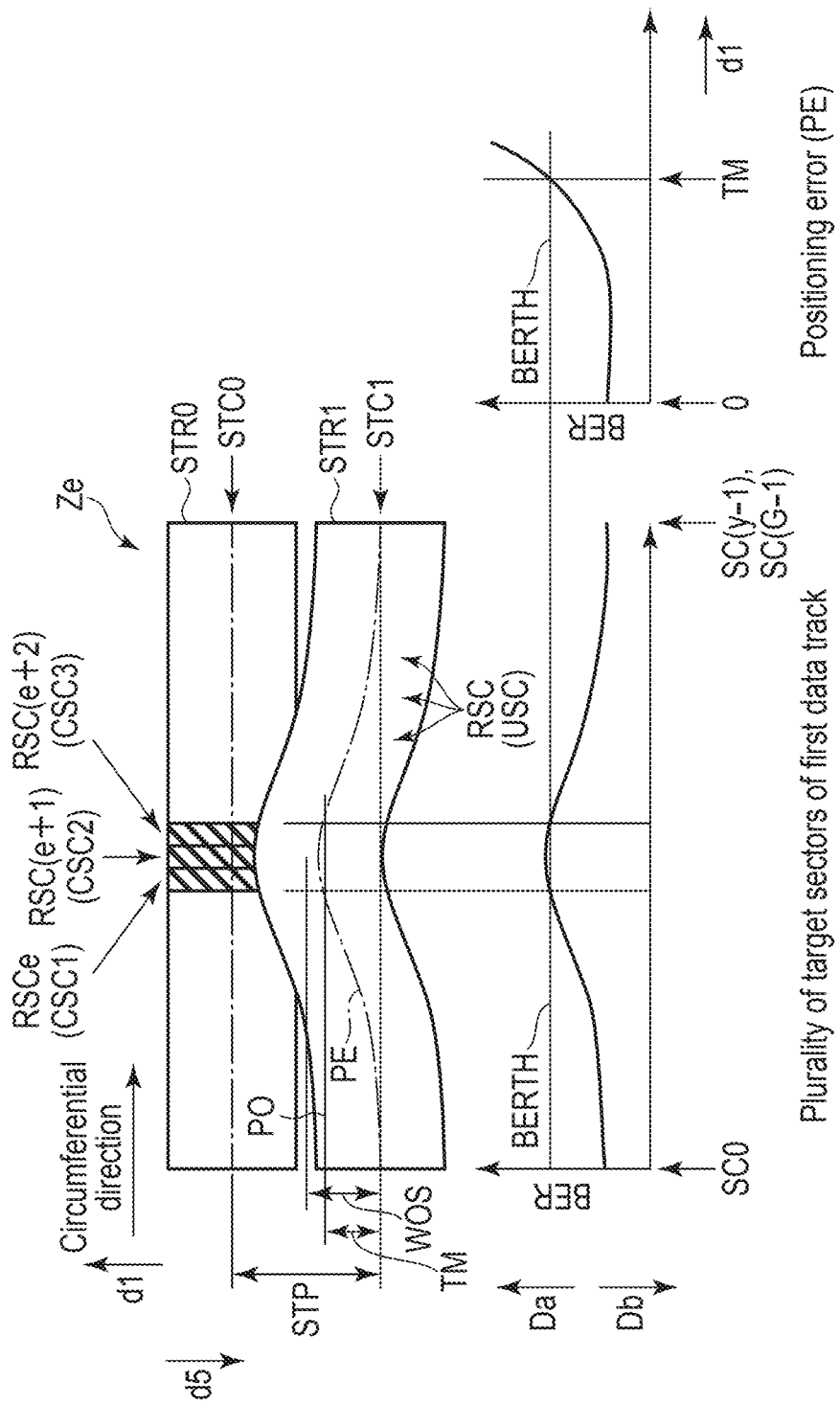
FIG. 12 is a schematic diagram showing an example of the first track and second track of a magnetic disk device that comprises a function of executing track-based error correction for the track data, illustrating the write processing for the first track and the second track, illustrating a state in which a determination value is set to a write-off track slice greater (more loose) than the track margin and the write processing for the second track is continued until track-based error correction for the first track reaches a limit, and illustrating each of the change in BER for the first track and the change in BER for the positioning error in graph form.

FIG. 12 is a schematic diagram showing an example of the first track STR0 and the second track STR1 of the magnetic disk device 1 that comprises a function of executing the track-based error correction for the data of the track TR, illustrating the write processing for the first track STR0 and the second track STR1, illustrating a state in which a determination value is set to the write-off track slice WOS greater (more loose) than the track margin TM and the write processing for the second track STR1 is continued until the track-based error correction for the first track STR0 reaches a limit, and illustrating each of the change in BER for the first track STR0 and the change in BER for the positioning error PE in graph form. In FIG. 12 as well, the first track STR0 and the like are drawn by assuming the circumferential direction to be linear, for convenience of descriptions.

As shown in FIG. 12, the write processing for the first track STR0 is executed ideally without any positioning error PE (PE≈0 or PE=0).

The magnetic disk device 1 comprises an error correction unit 64. When a corrupted target sector CSC occurs in the track ST, the read processing unit 63 can detect, together with the head amplifier IC 130, that a corrupted target sector CSC has occurred in the track ST, and the error correction unit 64 can execute the error correction processing to recover the data of the corrupted target sector CSC. For example, if a corrupted target sector CSC occurs in the first track STR0, the error correction unit 64 can recover the data of the corrupted target sector CSC, based on the data of the parity sector and the data of the plurality of elements of the target sectors RSC on the first track STR0.

The above parity sector is generated based on the data of the plurality of elements of target sectors RSC of the first track STR0, and can be provided in part of the plurality of target sectors RSC of the first track STR0. For example, one or two target sectors RSC of the first track STR0 can be used as the parity sector or sectors. However, the above parity sectors may be provided in tracks TR other than the first track STR0. Alternatively, the above parity sectors may be provided in the memory other than the disk (for example, nonvolatile memory 90).

As described above, even if a corrupted target sector CSC occurs in the first track STR0, the error correction unit 64 can execute the error correction processing to recover the data of the corrupted target sector CSC. The occurrence of the corrupted target sector CSC in the first track STR0 can be therefore allowed. In the magnetic disk device 1 comprising the error correction unit 64, the write-off track slice WOS can be set such that WOS≥TM, the write processing can hardly be ended, and deterioration in the write performance of the magnetic disk device 1 can be suppressed.

Incidentally, it needs to be noted that there is an upper limit for the number of corrupted target sectors for which the error correction unit 64 can execute the track-based error correction, in units of tracks TR. For example, if the number of corrupted target sectors CSC in the first track STR0 exceeds the upper limit (for example, 12), it is difficult for the error correction unit 64 to recover the data of all the corrupted target sectors CSC.

FIG. 13 is a table showing the presence or absence of a track ECC in the first to third methods of the first and second write operations, the name of the function that controls DOL, the contents of the processing in a case where the positioning error PE exceeds the reference radius position PO, the setting of the predicted upper limit threshold value, and the setting of the predicted excess amount.

As shown in FIG. 13, FIG. 11, and FIG. 1, when it is assumed that the magnetic disk device 1 does not comprise the function of the track ECC, the magnetic disk device 1 can adopt the first write operation. The name of the function of controlling Drift-Off Level (DOL) is Dynamic Drift-Off Level (DDOL). The first write operation corresponds to the write operation disclosed with reference to FIG. 11.

If the positioning error PE exceeds the reference radius position PO during the first write period during which the write processing for the second track STR1 is being executed, the write processing for the second track STR1 is suspended before the positioning error PE exceeds the track margin TM. After that, the write retry processing of resuming the write processing for the second track STR1 after waiting for the disk DK to rotate until PE≤WOS is executed.

Incidentally, if the magnetic disk device 1 adopts the first write operation, the write retry processing such as the disk DK rotation wait operation, may occur frequently. As a result, it is difficult to improve the write performance of the magnetic disk device 1. Therefore, in order to improve the write performance of the magnetic disk device 1, the magnetic disk device 1 that adopts the second write operation comprises the function of the track ECC. In the magnetic disk device 1 that adopts the second write operation, the name of the function of controlling the DOL is intelligence Dynamic Drift-Off Level (iDDOL).

It is possible to allow a certain number of corrupted target sectors CSC to occur in the track STR, and it is possible to improve Track Per Inch (TPI).

(Second Method of the Second Write Operation) (Predicted Upper Limit Threshold Value: Constant)

Next, the second method of the second write operation will be described. In this example, the predicted upper limit threshold value is treated as a constant.

As shown in FIG. 13, FIG. 1, and FIG. 12, the error correction unit 64 can execute the error correction of the data in one or more corrupted target sectors CSC in which the data is considered to be corrupted, among the plurality of target sectors RSC of the first track STR0.

The first write period, i.e., the period elapsed after the write processing unit 62 has executed the write processing for the plurality of target sectors RSC of the first track STR0, and the period in which the write processing unit 62 executes the write processing for the plurality of target sectors RSC of the second track STR1, is focused.

During the first write period, the read processing unit 63 executes the first seek processing of allowing the read head RHD to seek, moves the read head RHD at a first distance, and makes the write head WHD face the second track STR1. For example, if the write processing for the first track STR0 is followed by the write processing for the second track STR1, the above-described first distance corresponds to a distance for moving the read head RHD by one track.

The adjustment unit 65 derives the first predicted excess amount at which the position of the write head WHD is expected to be displaced beyond the reference radius position PO in the first direction Da during the first write period. The first predicted excess amount is an amount which varies depending on the distance (seek distance) for seeking the read head RHD. The adjustment unit 65 can adjust the predicted excess amount such as the first predicted excess amount in accordance with the seek distance.

For example, if the first distance corresponds to the distance for moving the read head RHD by one track, the adjustment unit 65 adjusts the predicted excess amount to the minimum predicted excess amount, which is the minimum amount.

In addition, the adjustment unit 65 derives the predicted upper limit threshold value indicating a limit of the range in which the error correction for the first track STR0 can be executed. The predicted upper limit threshold value is a constant.

Each time data is written to each target sector RSC of the second track STR1, the correction limit prediction unit 66 measures the actual excess amount of the position of the write head WHD, which is displaced beyond the reference radius position PO in the first direction Da, updates the cumulative actual excess amount, which is the cumulative total of the actual excess amount, and calculates the first cumulative predicted excess amount obtained by adding the first predicted excess amount to the cumulative actual excess amount.

The cumulative actual excess amount indicates an expected corruption amount of the data in the first track STR0 at the time when the write processing is executed up to the target sector RSC which the write head WHD faces, in the second track STR1.

The first cumulative predicted excess amount indicates the expected corruption amount of the data in the first track STR0 in a case where it is assumed that the next target sector RSC following the direction of traveling direction d2 is made to face the write head WHD and that write processing is executed for the target sector RSC.

When determining that the first cumulative predicted excess amount is smaller than or equal to the predicted upper limit threshold value, the determination unit 67 can allow the write processing unit 62 to continue the write processing for the second track STR1.

In addition, if determining that the first cumulative predicted excess amount exceeds the predicted upper limit threshold value, the determination unit 67 can make the write processing unit 62 suspend (or end) the write processing for the second track STR1.

As described above, the predicted excess amount can be adjusted in accordance with the seek distance in the second method of the second write operation. For example, a case where the first distance corresponds to a distance for moving the read head RHD by one track will be exemplified. If the second method of the second write operation is adopted, the adjustment unit 65 adjusts the predicted excess amount to the minimum predicted excess amount, which is the minimum amount. In contrast, if the first method of the second write operation is adopted, the adjustment unit 65 adjusts the predicted excess amount to the maximum predicted excess amount, which is the maximum amount. This is because the predicted excess amount is always fixed to the maximum predicted excess amount in the first method of the second write operation.

As compared to the case of adopting the first method of the second write operation, the cumulative predicted excess amount is not excessively increased in the second method of the second write operation. The frequency of suspending (or ending) the write processing for the second track STR1 can be thereby reduced. Then, when the write processing is ended, the frequency of invoking Partial Track Slip (PTS) saving the remaining data that could not be written to the second track STR1, can be reduced. The second method of the second write operation can contribute to improvement of the write performance of the magnetic disk device 1.

In this example, the n-th target sector RSCn of the second track STR1 is focused.

The plurality of target sectors RSC of the second track STR1 include the n-th target sector RSCn, and the n+1-th target sector RSC (n+1) following the n-th target sector RSCn in the traveling direction d2.

During the above-described first write period, the write processing unit 62 executes the write processing up to the n-th target sector RSCn of the second track STR1. The correction limit prediction unit 66 measures the above-described actual excess amount, updates the above-described cumulative actual excess amount, and calculates the above-described first cumulative predicted excess amount by adding the above-described first predicted excess amount to the cumulative actual excess amount. The first predicted excess amount is the amount at which the position of the write head WHD is expected to be displaced beyond the reference radius position PO in the first direction Da when it is assumed that the data is written to the n+1-th target sector RSC (n+1) during the first write period.

When determining that the first cumulative predicted excess amount is smaller than or equal to the predicted upper limit threshold value, the determination unit 67 can make the write processing unit 62 continue the write processing for the n+1-th target sector RSC (n+1) of the second track STR1.

In addition, if determining that the first cumulative predicted excess amount exceeds the predicted upper limit threshold value, the determination unit 67 can make the write processing unit 62 suspend (or end) the write processing for the n+1-th target sector RSC (n+1) of the second track STR1.

Next, the predicted excess amount such as the first predicted excess amount is focused.

If the above-described first distance is less than or equal to the distance for moving the read head RHD by one track in the radial direction d1, the adjustment unit 65 can adjust the first predicted excess amount (predicted excess amount) to the minimum predicted excess amount, which is the minimum amount.

In contrast, if the above-described first distance is more than or equal to the distance for moving the read head RHD by two tracks in the radial direction d1, the adjustment unit 65 can adjust the first predicted excess amount (predicted excess amount) to an amount greater than the minimum predicted excess amount.

Figure 14:
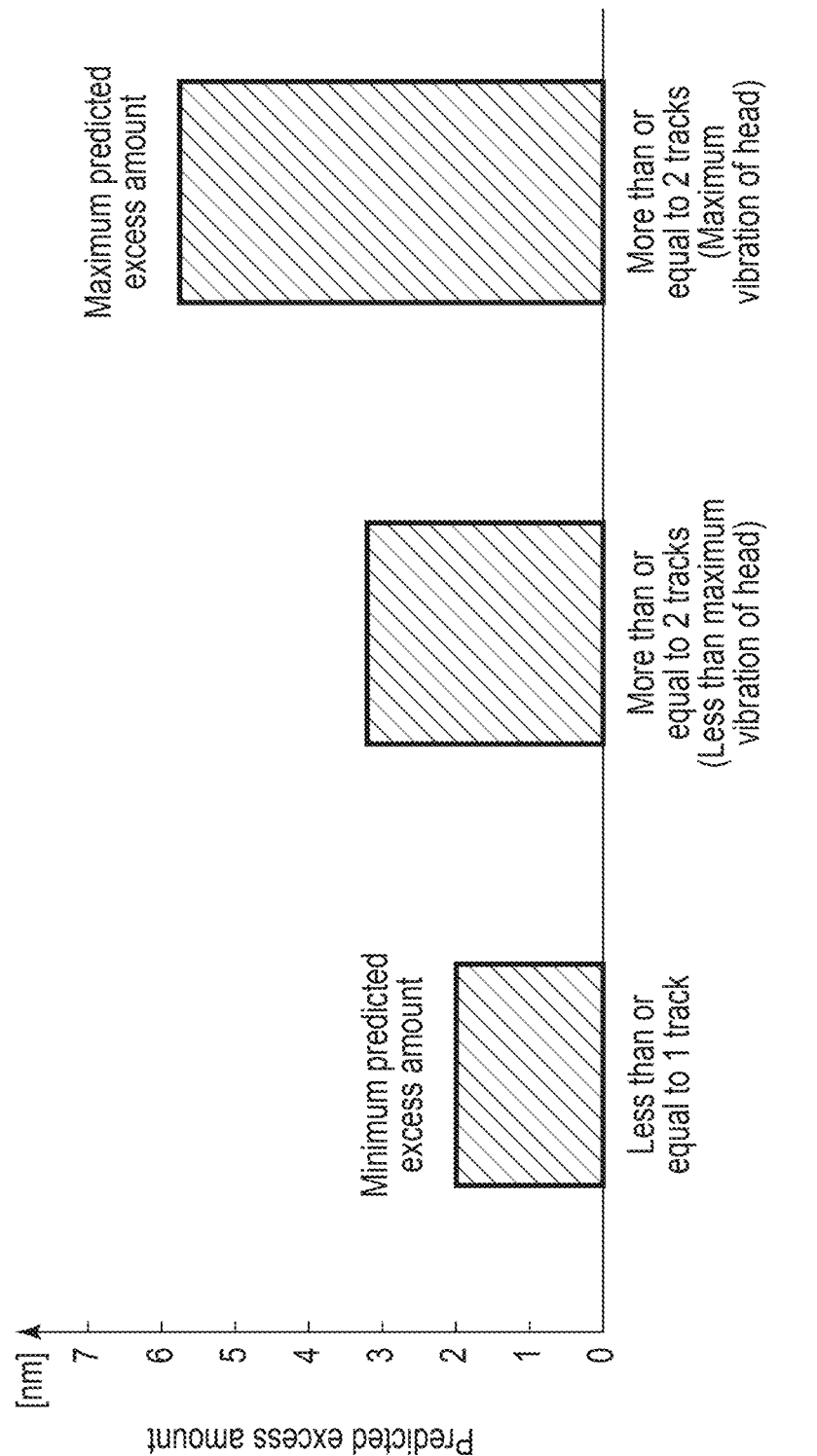
FIG. 14 is a bar graph showing the change in the predicted excess amount for the seek distance of the magnetic disk device.

Incidentally, since seek operations are executed using the technology of reducing head vibration, the above-described predicted excess amount is not a value proportional to the seek distance. However, it is expected that the vibration of the head HD in a case where the seek distance is more or equal to two tracks may be greater when the seek distance in a case where the seek distance is less than or equal to one track. Therefore, when the seek distance is two or more tracks, the predicted excess amount is adjusted to an amount greater than the minimum predicted excess amount (FIG. 14). Incidentally, the numerical values on the vertical axis in FIG. 14 are examples and can be variously changed.

The seek operation that can reduce the head vibration will be described here.

The period during which the read processing unit 63 executes the seek processing includes a first period that is the acceleration period, and a last period that is the deceleration period. During the acceleration period, the read processing unit 63 causes the read head RHD to seek while gradually increasing the speed in the first seek direction. During the deceleration period, the read processing unit 63 causes the read head RHD to seek while gradually decreasing the speed in the first seek direction.

The first seek direction is the inward direction when causing the read head RHD to seek to the second track STR1 from the outer circumferential side, and the first seek direction is the outward direction when causing the read head RHD to seek to the second track STR1 from the inner circumferential side.

The read head RHD is not made to seek at a constant speed, but the read head RHD is made to seek in an ease-in/ease-out manner. Since sudden changes in the speed of the read head RHD during seeking can be suppressed, a risk of exciting the resonance frequency of the mechanical system can be reduced. Such seeking operations can also contribute to improvement of the write performance of the magnetic disk device 1 by being adopted together with the second method of the second write operation.

Next, inserting a seek operation in the middle of the write processing for the second track STR1 will be described. In this example, the n-th target sector RSCn will be focused.

If the write processing is executed up to the n-th target sector RSCn of the second track STR1 during the first write period, if the read head RHD is made to seek after the first write period, and then if the write processing is resumed from the n+1-th target sector RSC (n+1) of the second track STR1 during the second write period, the write processing unit 62 and the correction limit prediction unit 66 execute the following processing during the first write period.

The write processing unit 62 executes the write processing up to the n-th target sector RSCn of the second track STR1.

The correction limit prediction unit 66 measures the actual excess amount, updates the cumulative actual excess amount, and calculates the first cumulative predicted excess amount by adding the first predicted excess amount to the above-described cumulative actual excess amount. The first predicted excess amount is the amount at which the position of the write head WHD is expected to be displaced beyond the reference radius position PO in the first direction Da when it is assumed that the data is written to the n+1-th target sector RSC (n+1) during the first write period.

During the second write period, the read processing unit 63, the adjustment unit 65, the correction limit prediction unit 66, and the determination unit 67 execute the following processing.

The read processing unit 63 executes the second seek processing of allowing the read head RHD to seek, moves the read head RHD in a second distance, and makes the write head WHD face the second track STR1 again.

The adjustment unit 65 derives again the second predicted excess amount at which the position of the write head WHD is expected to be displaced beyond the reference radius position PO in the first direction Da during the second write period. The second predicted excess amount is the amount corresponding to the above-described second distance.

The correction limit prediction unit 66 recalculates the second cumulative predicted excess amount by adding the second predicted excess amount to the cumulative actual excess amount. The second predicted excess amount is the amount at which the position of the write head WHD is expected to be displaced beyond the reference radius position PO in the first direction Da when it is assumed that the data is written to the n+1-th target sector RSC (n+1) during the second write period.

When determining that the second cumulative predicted excess amount is smaller than or equal to the predicted upper limit threshold value, the determination unit 67 can make the write processing unit 62 resume the write processing for the n+1-th target sector RSC (n+1) of the second track STR1.

In addition, if determining that the second cumulative predicted excess amount exceeds the predicted upper limit threshold value, the determination unit 67 can make the write processing unit 62 suspend (or end) the write processing for the n+1-th target sector RSC (n+1) of the second track STR1.

As described above, if the magnetic disk device 1 adopts the second method of the second write operation, the predicted excess amount can be adjusted. The write performance of the magnetic disk device 1 can be therefore improved.

Incidentally, if the seek distance is two or more tracks, the predicted excess amount is adjusted to an amount larger than the minimum predicted excess amount. For this reason, there is a risk that the frequency of suspending (or ending) the write processing for the second track STR1 may be increased as compared to a case where the seek distance is one or less tracks. Then, in the case where the write processing is ended, there is a risk that the frequency of invoking PTS to save the remaining data that could not be written to the second track STR1 will increase.

Therefore, when suspending the write processing for the second track STR1, the magnetic disk device 1 that adopts the third method of the second write operation can execute a rotation wait operation for the disk DK and adjust the predicted excess amount to a smaller amount.

(Third Method of the Second Write Operation) (Predicted Upper Limit Threshold Value: Constant)

Next, the third method of the second write operation will be described. In this example, the predicted upper limit threshold value is treated as a constant.

During the first write period, if the first distance in which the read processing unit 63 moves the read head RHD is more than or equal to the distance for moving the read head by two data tracks, if the first predicted excess amount that the adjustment unit 65 adjusts is an amount more than the minimum amount, and if the determination unit 67 determines that the first cumulative predicted excess amount has exceeded the predicted upper limit threshold value, the correction limit prediction unit 66 and the determination unit 67 execute the following processing.

The correction limit prediction unit 66 further calculates the minimum cumulative predicted excess amount by adding the above-described minimum predicted excess amount to the cumulative actual excess amount.

If determining that the minimum cumulative predicted excess amount is less than or equal to the predicted upper limit threshold value, the determination unit 67 can control the drive of the write processing unit 62, suspend the write processing for the second track STR1, maintain the position of the write head WHD in the radial direction d1, and shift to the write retry operation of waiting for the disk DK to rotate and resuming the write processing. Therefore, the frequency of activation of the PTS can be reduced and the utilization efficiency of the track STR can be improved as compared to the second method of the second write operation.

In addition, since the delay of command processing is longer when the PTS is activated than that when the write retry operation is executed, preparing the option to shift to the write retry operation is effective for improvement of the write performance.

In addition, if determining that the minimum cumulative predicted excess amount exceeds the predicted upper limit threshold value, the determination unit 67 can cause the write processing unit 62 to end the write processing for the second track STR1 and to save the remaining data that could not be written to the second track STR1 to a recording area other than the first track STR0 and the second track STR1. The recording areas other than the first track STR0 and the second track STR1 are the tracks on the disk DK such as the third track STR, which is located in the overwrite direction d5 as viewed from the second track STR1 and is adjacent to the second track STR1. The recording areas other than the first track STR0 and the second track STR1 may be a storage medium outside the disk DK.

(Second Method of Second Write Operation) (Predicted Upper Limit Threshold Value: Variable)

Next, another example of the second method of the second write operation will be described. In this example, the predicted upper limit threshold value is treated as a variable. In addition, the second method of the second write operation that treats the predicted upper limit threshold value as a variable is the same as the second method of the second write operation that treats the predicted upper limit threshold value as a constant, except for the details described here.

As shown in FIG. 13, FIG. 1, and FIG. 12, the first write period, i.e., the period elapsed after the write processing unit 62 has executed the write processing for the plurality of target sectors RSC of the first track STR0, and the period in which the write processing unit 62 executes the write processing for the plurality of target sectors RSC of the second track STR1, is focused.

During the first write period, the read processing unit 63 executes the above-described first seek processing and makes the write head WHD face the second track STR1.

The adjustment unit 65 derives the first predicted excess amount.

In addition, the adjustment unit 65 derives the predicted upper limit threshold value indicating a limit of the range in which the error correction for the first track STR0 can be executed. The predicted upper limit threshold value is a variable. The predicted upper limit threshold value has a smaller value as each of the predicted excess amounts including the first predicted excess amount increases.

The correction limit prediction unit 66 calculates the first cumulative predicted excess amount each time data is written to each of the target sectors RSC of the second track STR1.

When determining that the first cumulative predicted excess amount is smaller than or equal to the predicted upper limit threshold value, the determination unit 67 can allow the write processing unit 62 to continue the write processing for the second track STR1.

In addition, if determining that the first cumulative predicted excess amount exceeds the predicted upper limit threshold value, the determination unit 67 can make the write processing unit 62 suspend (or end) the write processing for the second track STR1.

As described above, the predicted excess amount can be adjusted in accordance with the seek distance in the second method of the second write operation using the predicted upper limit threshold value as a variable. In addition, the predicted upper limit threshold value is a variable in the second method of the second write operation using the predicted upper limit threshold value as a variable. For example, if the first distance corresponds to the distance for moving the read head RHD by one track, the adjustment unit 65 can adjust the first predicted excess amount to the minimum predicted excess amount, which is the minimum amount, adjust the first cumulative predicted excess amount to the minimum amount, and adjust the predicted upper limit threshold value to the maximum predicted upper limit threshold value, which is the maximum value. Since the first cumulative predicted excess amount is set such that it is unlikely to exceed the predicted upper limit threshold value, it is possible to facilitate continuing the write processing for the second track STR1.

In contrast, if the first distance corresponds to the distance for moving the read head RHD by two or more tracks, and if the adjustment unit 65 adjusts the first predicted excess amount to the maximum predicted excess amount, which is the maximum amount, and adjusts the first cumulative predicted excess amount to the maximum amount, the adjustment unit 65 can adjust the predicted upper limit threshold value to the minimum predicted upper limit threshold value, which is the minimum value. Since the first cumulative predicted excess amount is set to easily exceed the predicted upper limit threshold value, it is possible to easily suspend (or end) the write processing for the second track STR1.

The second method of the second write operation treating the predicted upper limit threshold value as a variable can contribute to improvement of the write performance of the magnetic disk device 1.

Next, the predicted excess amount such as the first predicted excess amount, and the predicted upper limit threshold value are focused.

If the above-described first distance is less than or equal to the distance for moving the read head RHD by one track in the radial direction d1, the adjustment unit 65 can adjust the first predicted excess amount (predicted excess amount) to the minimum predicted excess amount, which is the minimum amount, and can adjust the predicted upper limit threshold value to the maximum predicted upper limit threshold, which is the maximum amount.

In contrast, if the above-described first distance is greater than or equal to the distance for moving the read head RHD by two tracks in the radial direction d1, the adjustment unit 65 can adjust the first predicted excess amount (predicted excess amount) to a value greater than the minimum predicted excess amount, and can adjust the predicted upper limit threshold value to a value smaller than the maximum predicted upper limit threshold value.

Next, inserting a seek operation in the middle of the write processing for the second track STR1 will be described. In this example, the n-th target sector RSCn will be focused.

If the write processing is executed up to the n-th target sector RSCn of the second track STR1 during the first write period, if the read head RHD is made to seek after the first write period, and then if the write processing is resumed from the n+1-th target sector RSC (n+1) of the second track STR1 during the second write period, the write processing unit 62 and the correction limit prediction unit 66 execute the following processing during the first write period.

The write processing unit 62 executes the write processing up to the n-th target sector RSCn of the second track STR1.

The correction limit prediction unit 66 measures the actual excess amount, updates the cumulative actual excess amount, and calculates the first cumulative predicted excess amount by adding the first predicted excess amount to the above-described cumulative actual excess amount.

During the second write period, the read processing unit 63, the adjustment unit 65, the correction limit prediction unit 66, and the determination unit 67 execute the following processing.

The read processing unit 63 executes the above-described second seek processing and makes the write head WHD face the second track STR1 again.

The adjustment unit 65 derives the above-described second predicted excess amount again.

In addition, the adjustment unit 65 adjusts the predicted upper limit threshold value to a value corresponding to the above-described second predicted excess amount.

The correction limit prediction unit 66 recalculates the second cumulative predicted excess amount by adding the second predicted excess amount to the cumulative actual excess amount.

When determining that the second cumulative predicted excess amount is smaller than or equal to the predicted upper limit threshold value, the determination unit 67 can make the write processing unit 62 resume the write processing for the n+1-th target sector RSC (n+1) of the second track STR1.

In addition, if determining that the second cumulative predicted excess amount exceeds the predicted upper limit threshold value, the determination unit 67 can make the write processing unit 62 suspend (or end) the write processing for the n+1-th target sector RSC (n+1) of the second track STR1.

Then, the second method of the second write operation, which treats the predicted upper limit threshold value as a variable, can also execute the rotation wait operation for the disk DK and adjust the predicted excess amount to a smaller amount when suspending the write operation for the second track STR1.

(Third Method of the Second Write Operation) (Predicted Upper Limit Threshold Value: Variable)

Next, another example of the third method of the second write operation will be described. In this example, the predicted upper limit threshold value is treated as a variable. In addition, the third method of the second write operation that treats the predicted upper limit threshold value as a variable is the same as the third method of the second write operation that treats the predicted upper limit threshold value as a constant, except for the details described here.

During the first write period, the first distance in which the read processing unit 63 moves the read head RHD is more than or equal to the distance for moving the read head by two data tracks, the first predicted excess amount adjusted by the adjustment unit 65 is an amount more than the minimum amount, the predicted upper limit threshold value adjusted by the adjustment unit 65 is a value smaller than the maximum predicted upper limit threshold value, and, if the determination unit 67 determines that the first cumulative predicted excess amount exceeds the predicted upper limit threshold value, the correction limit prediction unit 66 and determination unit 67 execute the following processing.

The correction limit prediction unit 66 further calculates the minimum cumulative predicted excess amount by adding the above-described minimum predicted excess amount to the cumulative actual excess amount.

If determining that the minimum cumulative predicted excess amount is less than or equal to the predicted upper limit threshold value, the determination unit 67 can control the drive of the write processing unit 62, suspend the write processing for the second track STR1, maintain the position of the write head WHD in the radial direction d1, and shift to the write retry operation of waiting for the disk DK to rotate and resuming the write processing. Thus, the frequency of activation of the PTS can be reduced and the utilization efficiency of the track STR can be increased.

In addition, if determining that the minimum cumulative predicted excess amount exceeds the predicted upper limit threshold value, the decision unit 67 can cause the write processing unit 62 to end the write processing for the second track STR1 and to save the remaining data that could not be written to the second track STR1 to a recording area other than the first track STR0 and the second track STR1.

(Examples of the Second and Third Methods of the Second Write Operation) (Predicted Upper Limit Threshold Value: Constant)

Figure 15:
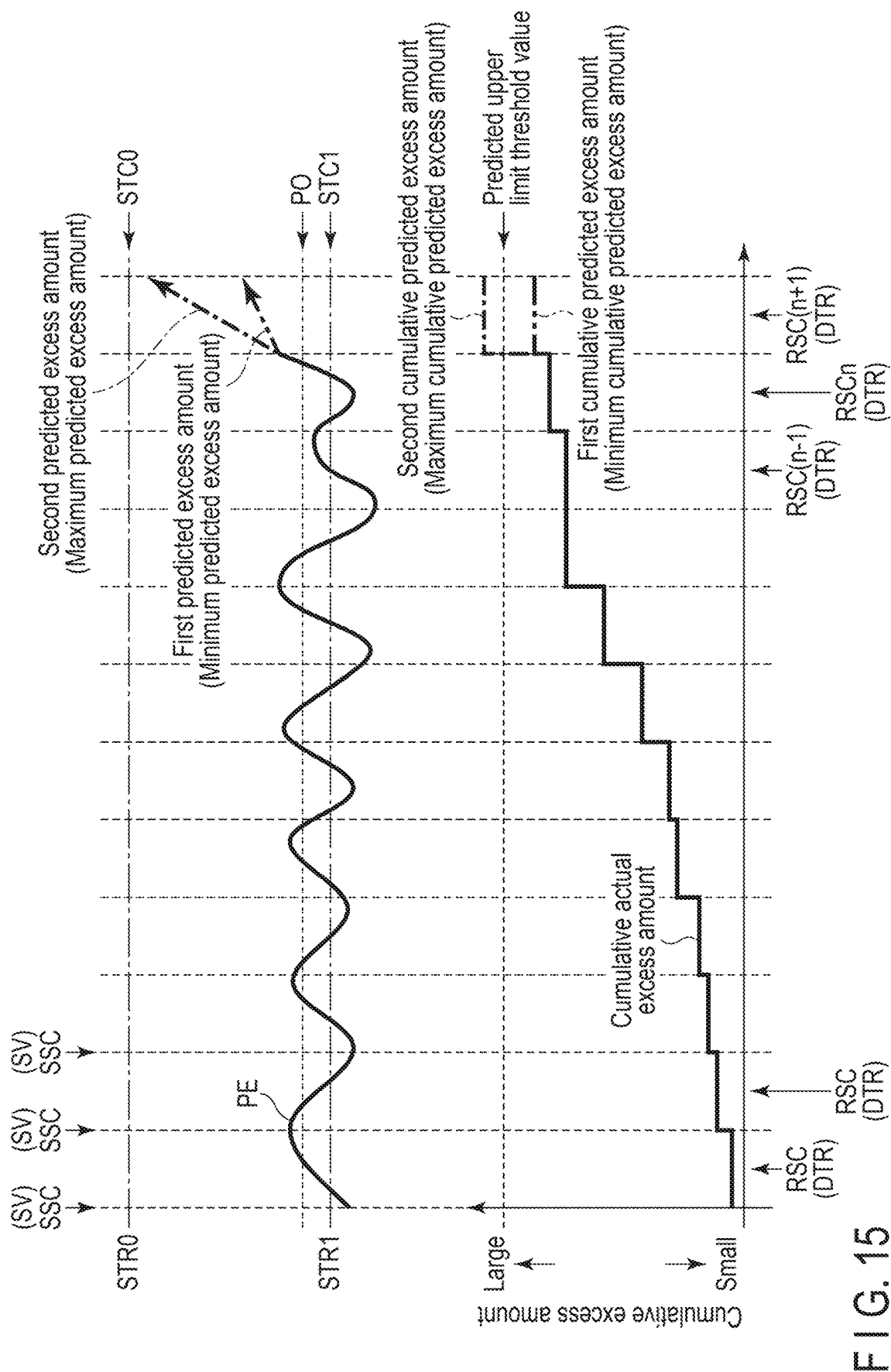
FIG. 15 is a chart showing the change in positioning error, the change in cumulative excess amount, and the change in cumulative predicted excess amount in a case of executing the write processing for the second track in the second and third methods of the above second write operation, and showing a case where the predicted upper limit threshold value is a constant.

Next, examples of the second and third methods of the second write operation will be described. In this example, the predicted upper limit threshold value is treated as a constant. FIG. 15 is a chart showing the change in positioning error PE, the change in cumulative excess amount, and the change in cumulative predicted excess amount in a case of executing the write processing for the second track STR1 in the second and third methods of the second write operation, and showing a case where the predicted upper limit threshold value is a constant.

As shown in FIG. 15, a plurality of target sectors RSC (data areas DTR) and a plurality of servo sectors SSC (servo areas SV) are arranged in a circumferential direction. Each time the read head RHD passes through the servo sector SSC, the position of the head HD in the radial direction d1 can be corrected. This processing is effective when the head HD is in a vibrating state due to influences of the seek operation, and the like. However, the proportion (size) of the servo sector SSC to the track STR is smaller than the proportion (size) of the target sector RSC to the track STR. For this reason, it is difficult to sufficiently correct the position of the head HD in the radial direction d1.

As a result, if the write processing is executed for the plurality of target sectors RSC of the second track STR1, the positioning error PE may exceed the reference radius position PO a plurality of times. The correction limit prediction unit 66 calculates the cumulative predicted excess amount, and the management unit 68 predicts the number of corrupted target sectors CSC of the first track STR0. In other words, during the write period when the write process is executed for the second track STR1, each time the positioning error PE exceeds the reference radius position PO, the management unit 68 detects that a corrupted target sector CSC occurs in the first track STR0, and can manage the cumulative total of the number of corrupted target sectors CSC on the first track STR0.

In the example of FIG. 15, a point of time at which the write processing unit 62 executes the write processing up to the n-th target sector RSCn of the second track STR1 is focused. The management unit 68 can determine that ten corrupted target sectors CSC have occurred in the first track STR0. It is assumed that the error correction unit 64 can execute the error correction for up to twelve corrupted target sectors CSC in the first track STR0. In this case, the determination unit 67 can determine that occurrence of ten corrupted target sectors CSC in the first track STR0 can be accepted, and that occurrence of a maximum of up to two new corrupted target sectors CSC can be accepted.

Furthermore, the determination unit 67 can determine whether the cumulative predicted excess amount has exceeded the predicted upper limit threshold value. In the example of FIG. 15, the first predicted excess amount and the first cumulative predicted excess amount correspond to the case where the seek distance is less than or equal to one track (FIG. 14). For example, the write processing for the first track STR0 is followed by the write processing for the second track STR1. The first predicted excess amount becomes the minimum predicted excess amount, and the first cumulative predicted excess amount becomes the minimum cumulative predicted excess amount. Since the cumulative predicted excess amount is less than or equal to the predicted upper limit threshold value, the determination unit 67 can determine that the write processing to the second track STR1 can be continued.

In contrast, in the example shown in FIG. 15, the second predicted excess amount and the second cumulative predicted excess amount correspond to the case where the seek distance is two or more tracks and the vibration of the head HD is maximum (FIG. 14). For example, after executing the write processing up to the n-th target sector RSCn of the second track STR1 during the first write period, a seek operation is executed, and then, resumption of the write processing from the n+1-th target sector RSC (n+1) of the second track STR1 is attempted during the second write period. The second predicted excess amount becomes the maximum predicted excess amount, and the second cumulative predicted excess amount becomes the maximum cumulative predicted excess amount. Since the cumulative predicted excess amount exceeds the predicted upper limit threshold value, the determination unit 67 can determine that it is necessary to suspend (or end) the write processing for the second track STR1.

(Examples of the Second and Third Methods of the Second Write Operation) (Predicted Upper Limit Threshold Value: Variable)

Figure 16:
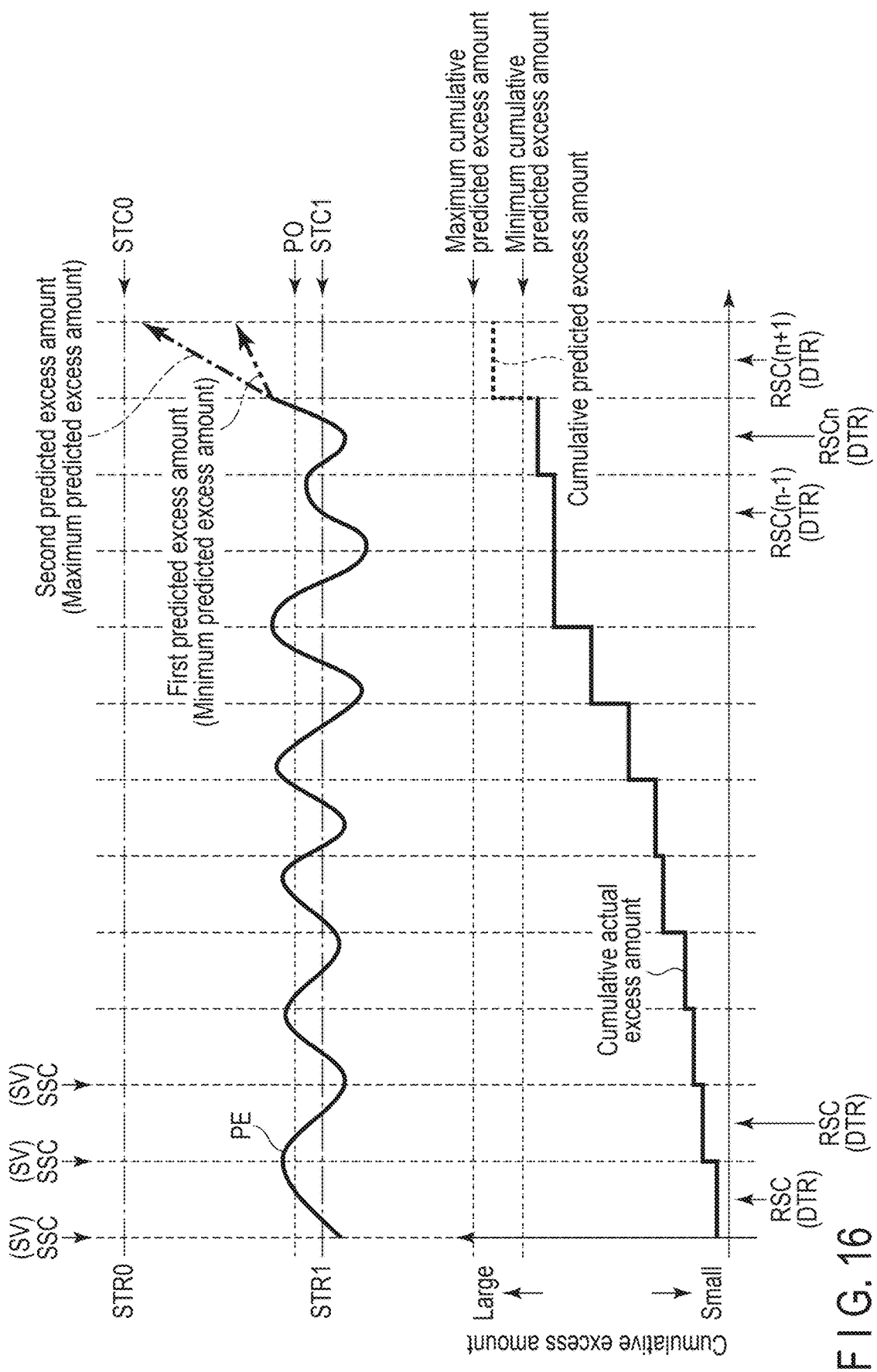
FIG. 16 is a chart showing the change in positioning error, the change in cumulative excess amount, and the change in cumulative predicted excess amount in a case of executing the write processing for the second track in the second and third methods of the above second write operation, and showing a case where the predicted upper limit threshold value is a variable.

Next, examples of the second and third methods of the second write operation will be described. In this example, the predicted upper limit threshold value is treated as a variable. FIG. 16 is a chart showing the change in positioning error PE, the change in cumulative excess amount, and the change in cumulative predicted excess amount in a case of executing the write processing for the second track STR1 in the second and third methods of the second write operation, and showing a case where the predicted upper limit threshold value is a variable.

As shown in FIG. 16, first, a point of time at which the write processing unit 62 executes the write processing up to the n-th target sector RSCn of the second track STR1 is focused. The management unit 68 can determine that ten corrupted target sectors CSC have occurred in the first track STR0. In this case, the determination unit 67 can determine that occurrence of ten corrupted target sectors CSC in the first track STR0 can be accepted, and that occurrence of a maximum of up to two new corrupted target sectors CSC can be accepted.

Furthermore, the determination unit 67 can determine whether the cumulative predicted excess amount has exceeded the predicted upper limit threshold value. In the example in FIG. 16, the first predicted excess amount corresponds to the case where the seek distance is less than or equal to one track (FIG. 14). For example, the write processing for the first track STR0 is followed by the write processing for the second track STR1. The first predicted excess amount becomes the minimum predicted excess amount, and the predicted upper limit threshold value becomes the maximum predicted upper limit threshold value. Since the cumulative predicted excess amount is less than or equal to the predicted upper limit threshold value, the determination unit 67 can determine that the write processing to the second track STR1 can be continued.

In contrast, in the example shown in FIG. 16, the second predicted excess amount corresponds to the case where the seek distance is two or more tracks and the vibration of the head HD is maximum (FIG. 14). For example, after executing the write processing up to the n-th target sector RSCn of the second track STR1 during the first write period, a seek operation is executed, and then, resumption of the write processing from the n+1-th target sector RSC (n+1) of the second track STR1 is attempted during the second write period. The second predicted excess amount becomes the maximum predicted excess amount, and the predicted upper limit threshold value becomes the minimum predicted upper limit threshold value. Since the cumulative predicted excess amount exceeds the predicted upper limit threshold value, the determination unit 67 can determine that it is necessary to suspend (or end) the write processing for the second track STR1.

Figure 17:
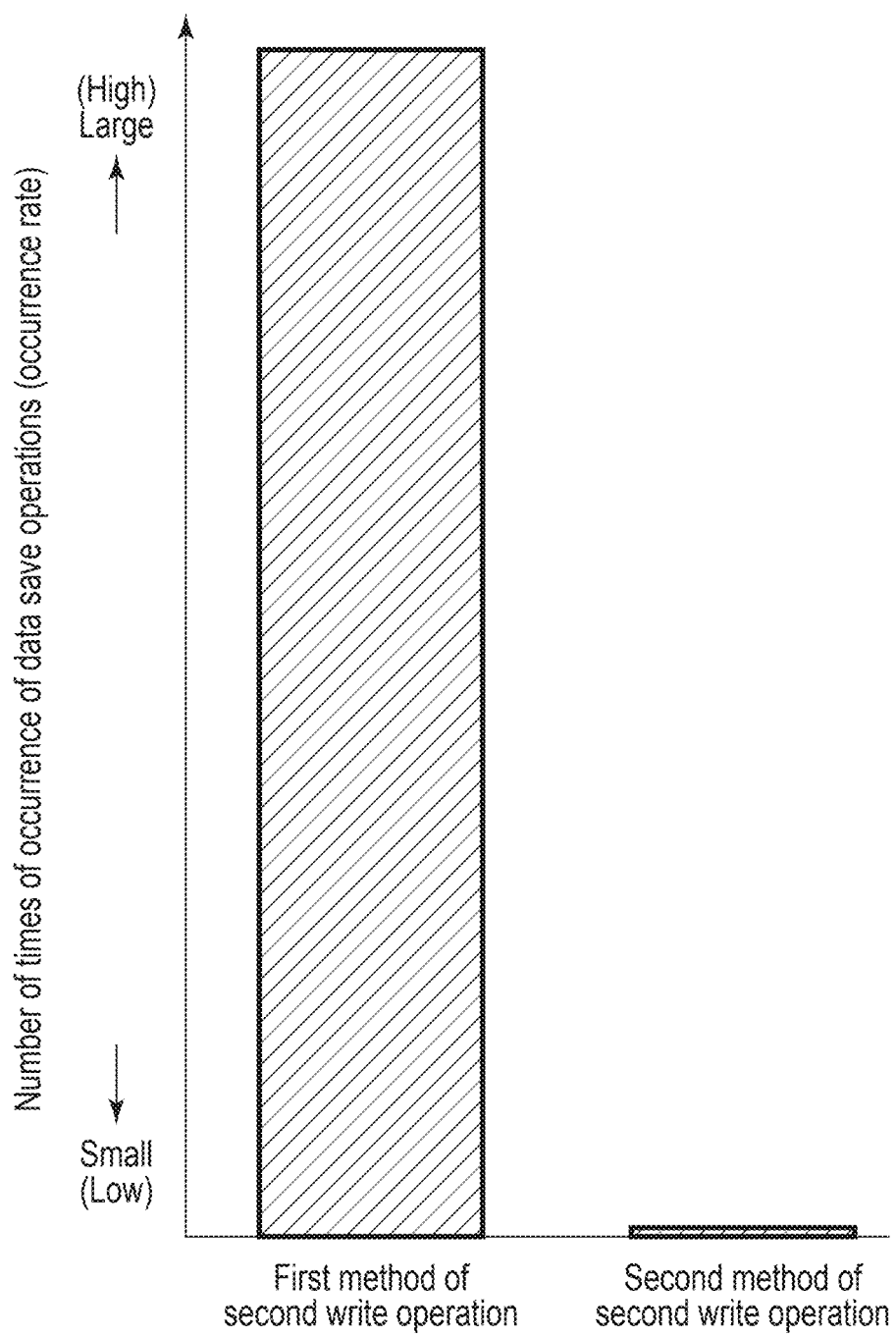
FIG. 17 is a bar graph showing the number of times of occurrence (occurrence rate) of the PTS in a case where the above-described magnetic disk device adopts the first method of the second write operation and the second method of the second write operation.

Next, the results of the investigation of the number of times of occurrence of the PTS will be described. FIG. 17 is a bar graph showing the number of times of occurrence (occurrence rate) of the PTS in a case where the above-described magnetic disk device 1 adopts the first method of the second write operation and the second method of the second write operation.

As shown in FIG. 17, it can be understood that since the second method of the second write operation does not excessively increase the cumulative predicted excess amount, as compared to the case of adopting the first method of the second write operation, the method can reduce the frequency of suspending (or terminating) the write processing for the second track STR1. Since the second method of the second write operation can reduce the frequency of activation of the PTS, the method can contribute to improvement of the write performance of the magnetic disk device 1.

Incidentally, the bar graph for the third method of the second write operation is not shown, but the third method of the second write operation can also reduce the frequency of activation of the PTS and can contribute to improvement of the write performance of the magnetic disk device 1.

Next, an example of the first write operation will be described with reference to a flowchart. FIG. 18 is a flowchart showing a write processing method for the n-th target sector RSCn of the second track STR1, of the write processing method of the embodiment, illustrating a case where the magnetic disk device 1 adopts the first write operation during the first write period.

As shown in FIG. 18, FIG. 1, and FIG. 12, when the first write operation starts, first, the write processing unit 62 executes the write processing for the n-th target sector RSCn of the second track STR1, in step ST1a. Next, in step ST2a, the correction limit prediction unit 66 determines whether the positioning error PE has exceeded the reference radius position PO.

If the positioning error PE exceeds the reference radius position PO (step ST2a, YES), the processing shifts to step ST3a, and the write processing unit 62 suspends the write processing for the second track STR1. Next, in step ST4a, the write processing unit 62 starts write retry processing for the second track STR1. The first write operation is thereby ended.

In contrast, if the positioning error PE is less than or equal to the reference radius position PO (step ST2a, NO), the processing shifts to step ST5a, and the write processing unit 62 continues the write processing for the second track STR1 and ends the first write operation.

Figure 19:
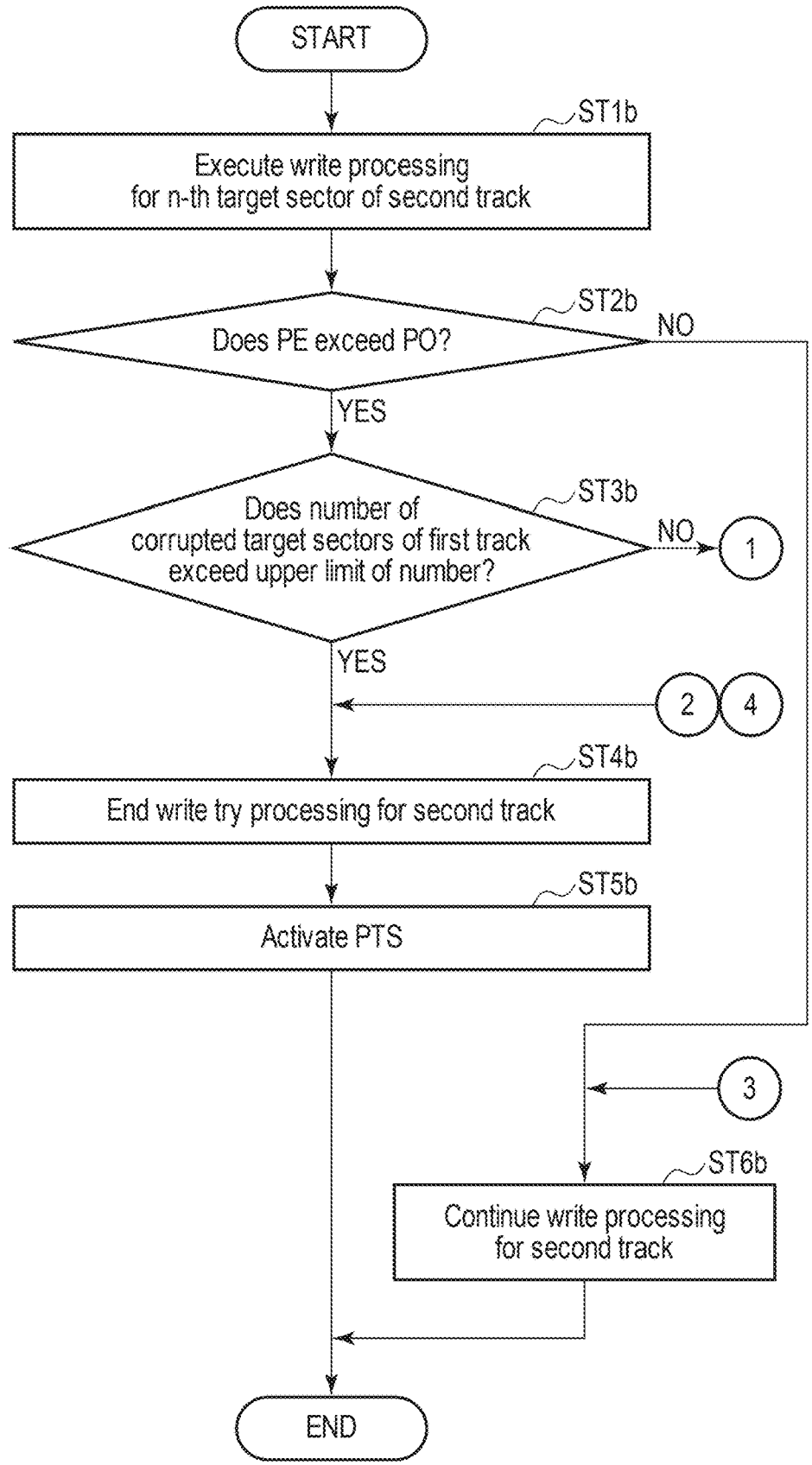
FIG. 19 is a flowchart showing a write processing method for an n-th target sector of the second track, of the write processing method for the above-described embodiment, illustrating a case where the above-described magnetic disk device adopts the second method of the second write operation during the first write period.
Figure 20:
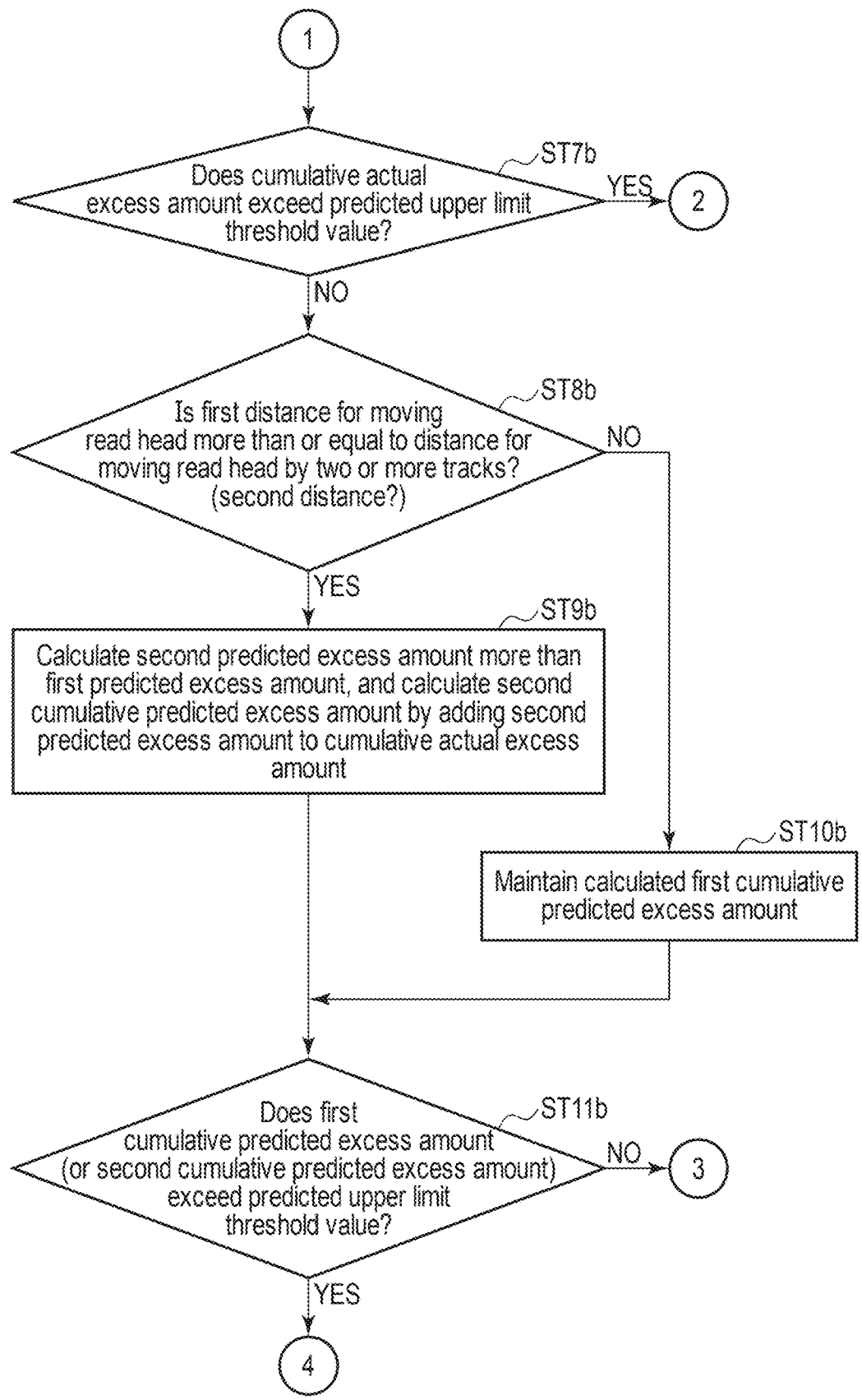
FIG. 20 is a flowchart showing the above-described write processing method, following FIG. 19.

Next, an example of the second method of the second write operation treating the predicted upper limit threshold value as a constant will be described with reference to a flowchart. FIG. 19 is a flowchart showing a write processing method for the n-th target sector RSCn of the second track STR1, of the write processing method of the embodiment, illustrating a case where the magnetic disk device 1 adopts the second method of the second write operation during the first write period. FIG. 20 is a flowchart showing the write processing method following FIG. 19.

As shown in FIG. 19, FIG. 1, FIG. 12, and FIG. 15, when the second method of the second write operation, which treats the predicted upper limit threshold value as a constant, is started, first, the write processing unit 62 executes the write processing for the n-th target sector RSCn of the second track STR1, in step ST1b. Next, in step ST2b, the correction limit prediction unit 66 determines whether the positioning error PE has exceeded the reference radius position PO.

If the positioning error PE exceeds the reference radius position PO (step ST2b, YES), the processing shifts to step ST3b, and the determination unit 67 determines whether the number of corrupted target sectors CSC on the first track STR0 exceeds the upper limit (for example, 12). If the number of corrupted target sectors CSC on the first track STR0 exceeds the upper limit of the number (step ST3b, YES), the processing shifts to step ST4b, and the write processing unit 62 ends the write processing for the second track STR1, and the magnetic disk device 1 activates the PTS in step ST5b. The second method of the second write operation is thereby ended.

In contrast, if the positioning error PE is less than or equal to the reference radius position PO (step ST2b, NO), the processing shifts to step ST6b, and the write processing unit 62 continues the write processing for the second track STR1 and ends the second method of the second write operation.

As shown in FIG. 20, FIG. 1, FIG. 12, and FIG. 15, if the number of corrupted target sectors CSC on the first track STR0 is less than or equal to the upper limit of the number (step ST3b, NO), the processing shifts to step ST7b, and the determination unit 67 determines whether the cumulative actual excess amount exceeds the predicted upper limit threshold value. If the cumulative actual excess amount exceeds the predicted upper limit threshold value (step ST7b, YES), the processing shifts to step ST4b in FIG. 19.

In contrast, if the cumulative actual excess amount is less than or equal to the predicted upper limit threshold value (step ST7b, NO), the processing shifts to step ST8b, and the magnetic disk device 1 determines whether the first distance for moving the read head RHD is more than or equal to the distance for moving the read head by two tracks. If the first distance is more than or equal to the distance for moving the read head by two tracks (step ST8b, YES), the processing shifts to step ST9b, the adjustment unit 65 calculates the second predicted excess amount, which is more than the first predicted excess amount (i.e., adjusts the first predicted excess amount to the second predicted excess amount), the correction limit prediction unit 66 calculates (recalculates) the second cumulative predicted excess amount by adding the second predicted excess amount to the cumulative actual excess amount, and the processing shifts to step ST11b.

If the first distance is less than the distance for moving the read head by two tracks (step ST8b, NO), the processing shifts to step ST10b, the correction limit prediction unit 66 maintains the calculated first cumulative predicted excess amount, that the processing shifts to step ST11b. Next, in step ST11b, the determination unit 67 determines whether the first cumulative predicted excess amount (or the second cumulative predicted excess amount) has exceeded the predicted upper limit threshold value.

If the first cumulative predicted excess amount (or the second cumulative predicted excess amount) is less than or equal to the predicted upper limit threshold value (step ST11b, NO), the processing shifts to step ST6b in FIG. 19. In contrast, if the first cumulative predicted excess amount (or the second cumulative predicted excess amount) exceeds the predicted upper limit threshold value (step ST11b, YES), the processing shifts to step ST4b in FIG. 19.

Figure 22:
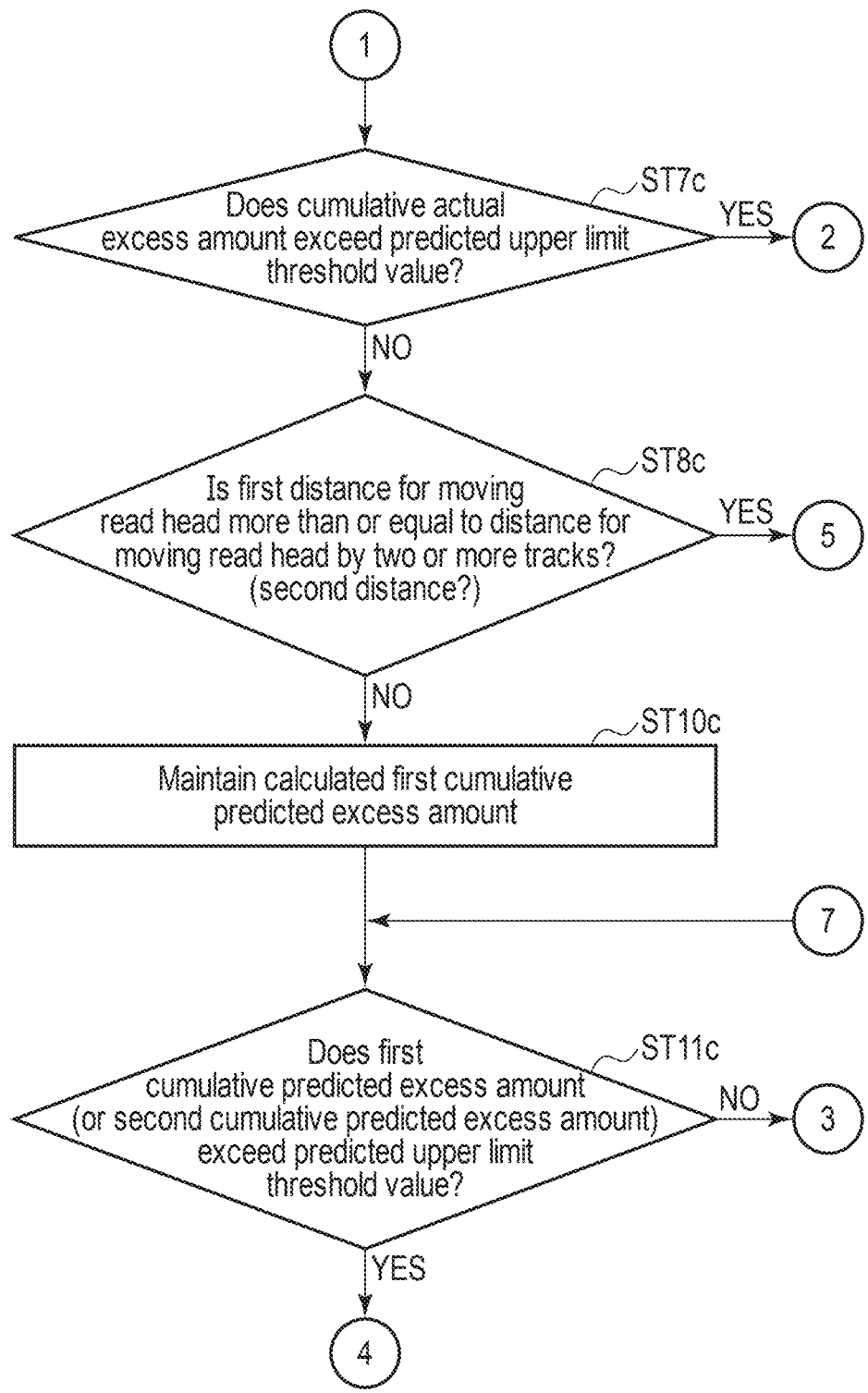
FIG. 22 is a flowchart showing the above-described write processing method, following FIG. 21.
Figure 23:
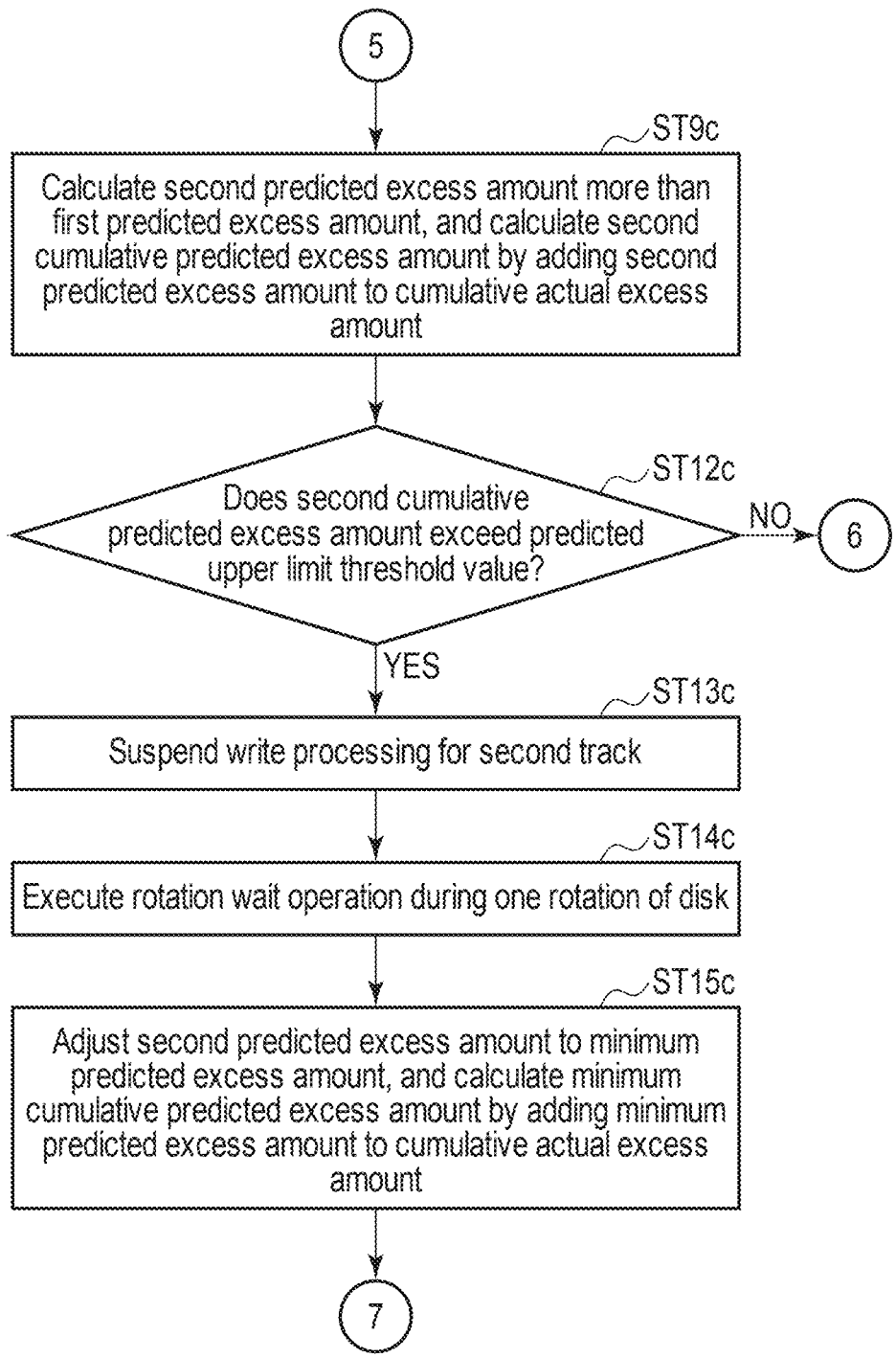
FIG. 23 is a flowchart showing the above-described write processing method, following FIG. 22.

Next, an example of the third method of the second write operation treating the predicted upper limit threshold value as a constant will be described with reference to a flowchart. FIG. 21 is a flowchart showing a write processing method for the n-th target sector RSCn of the second track STR1, of the write processing method of the embodiment, illustrating a case where the magnetic disk device 1 adopts the third method of the second write operation during the first write period and the second write period. FIG. 22 is a flowchart showing the write processing method following FIG. 21. FIG. 23 is a flowchart showing the write processing method following FIG. 22.

As shown in FIG. 21, FIG. 1, FIG. 12, and FIG. 16, when the third method of the second write operation, which treats the predicted upper limit threshold value as a constant, is started, first, the write processing unit 62 executes the write processing for the n-th target sector RSCn of the second track STR1, in step STIc. Next, in step ST2c, the correction limit prediction unit 66 determines whether the positioning error PE has exceeded the reference radius position PO.

If the positioning error PE exceeds the reference radius position PO (step ST2c, YES), the processing shifts to step ST3c, and the determination unit 67 determines whether the number of corrupted target sectors CSC on the first track STR0 exceeds the upper limit (for example, 12). If the number of corrupted target sectors CSC on the first track STR0 exceeds the upper limit of the number (step ST3c, YES), the processing shifts to step ST4c, and the write processing unit 62 ends the write processing for the second track STR1, and the magnetic disk device 1 activates the PTS in step ST5c. The third method of the second write operation is thereby ended.

In contrast, if the positioning error PE is less than or equal to the reference radius position PO (step ST2c, NO), the processing shifts to step ST6c, and the write processing unit 62 continues the write processing for the second track STR1 and ends the third method of the second write operation.

As shown in FIG. 22, FIG. 1, FIG. 12, and FIG. 16, if the number of corrupted target sectors CSC on the first track STR0 is less than or equal to the upper limit of the number (step ST3c, NO), the processing shifts to step ST7c, and the determination unit 67 determines whether the cumulative actual excess amount exceeds the predicted upper limit threshold value. If the cumulative actual excess amount exceeds the predicted upper limit threshold value (step ST7c, YES), the processing shifts to step ST4c in FIG. 21.

In contrast, if the cumulative actual excess amount is less than or equal to the predicted upper limit threshold value (step ST7c, NO), the processing shifts to step ST8c, and the magnetic disk device 1 determines whether the first distance for moving the read head RHD is more than or equal to the distance for moving the read head by two tracks. If the first distance is less than the distance for moving the read head by two tracks (step ST8c, NO), the processing shifts to step ST10c, the correction limit prediction unit 66 maintains the calculated first cumulative predicted excess amount, and the processing shifts to step ST11c. Next, in step ST11c, the determination unit 67 determines whether the first cumulative predicted excess amount (or the second cumulative predicted excess amount) exceeds the predicted upper limit threshold value.

If the first cumulative forecast excess amount (or the second cumulative forecast excess amount) is less than or equal to the predicted upper limit threshold value (step ST11c, NO), the processing shifts to step ST6c in FIG. 21. In contrast, if the first cumulative predicted excess amount (or the second cumulative predicted excess amount) exceeds the predicted upper limit threshold value (step ST11c, YES), the processing shifts to step ST4c in FIG. 21.

As shown in FIG. 23, FIG. 1, FIG. 12, and FIG. 16, if the first distance is more than or equal to the distance for moving the read head by two tracks (step ST8c, YES), the processing shifts to step ST9c, the adjustment unit 65 calculates the second predicted excess amount, which is more than the first predicted excess amount (i.e., adjusts the first predicted excess amount to the second predicted excess amount), the correction limit prediction unit 66 calculates (recalculates) the second cumulative predicted excess amount by adding the second predicted excess amount to the cumulative actual excess amount, and the processing shifts to step ST12c.

In step ST12c, the determination unit 67 determines whether the second cumulative predicted excess amount exceeds the predicted upper limit threshold value. If the second cumulative forecast excess amount is less than or equal to the predicted upper limit threshold value (step ST12c, NO), the processing shifts to step ST6c in FIG. 21. In contrast, if the second cumulative predicted excess amount exceeds the predicted upper limit threshold value (step ST12c, YES), the processing shifts to step ST13c, and the write processing unit 62 suspends the write processing for the second track STR1.

After that, in step ST14c, the determination unit 67 executes the rotation wait operation during one rotation of the disk DK. Then, the processing shifts to step ST15c, the adjustment unit 65 adjusts the second predicted excess amount to the minimum predicted excess amount, the correction limit prediction unit 66 calculates (recalculates) the minimum cumulative predicted excess amount by adding the minimum predicted excess amount to the cumulative actual excess amount, and the processing shifts to step ST11c in FIG. 22.

According to the magnetic disk device 1 of the embodiment configured as described above, the magnetic disk device 1 comprises the disk DK, the head HD, the read processing unit 63, the write processing unit 62, the error correction unit 64, the adjustment unit 65, the correction limit prediction unit 66, and the determination unit 67.

During the first write period, the read processing unit 63 executes the first seek processing of allowing the read head RHD to seek, moves the read head RHD in a first distance, and makes the write head WHD face the second track STR1. The adjustment unit 65 derives the first predicted excess amount and the predicted upper limit threshold value. The correction limit prediction unit 66 calculates the first cumulative predicted excess amount. When determining that the first cumulative predicted excess amount is smaller than or equal to the predicted upper limit threshold value, the determination unit 67 can allow the write processing unit 62 to continue the write processing for the second track STR1. When determining that the first cumulative predicted excess amount exceeds the predicted upper limit threshold value, the determination unit 67 can make the write processing unit 62 suspend the write processing for the second track STR1.

The adjustment unit 65 can adjust the predicted excess amount. In order to prevent the cumulative predicted excess amount from becoming excessively large, the frequency of suspending (or ending) the write processing for the second track STR1 can be reduced. Then, the frequency of activation of the PTS can be reduced. Then, the configuration can contribute to improvement of the write performance of the magnetic disk device 1.

Based on the above, it is possible to obtain the magnetic disk device 1 capable of predicting whether the error correction for the track STR of the disk DK reaches its limit in response to the seek operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk having a first data track and a second data track adjacent to each other in a recording layer, the first data track and the second data track each including a plurality of target sectors being targets to which data is written, the first data track being located in a first direction parallel to a radial direction of the disk as viewed from the second data track;
a head including a write head writing data to the recording layer and a read head reading data from the recording layer;
a read processing unit capable of executing seek processing of seeking the read head;
a write processing unit capable of executing write processing of writing data to the recording layer;
an error correction unit executing error correction of data in one or more corrupted target sectors whose data is determined to be corrupted, among the plurality of target sectors of the first data track;
an adjustment unit;
a correction limit prediction unit; and
a determination unit,
wherein
during a first write period being a period elapsed after the write processing unit executes the write processing for the plurality of target sectors of the first data track and being the period during which the write processing unit executes the write processing for the plurality of target sectors of the second data track,
the read processing unit executes first seek processing of seeking the read head, moves the read head at a first distance, and makes the write head face the second data track,
the adjustment unit
derives a first predicted excess amount at which a position of the write head is expected to be displaced beyond a reference radius position in the first direction during the first write period, the first predicted excess amount being varied in accordance with a distance for seeking the read head, and
derives a predicted upper limit threshold value indicating a limit of a range in which the error correction for the first data track is executable, the predicted upper limit threshold value being a constant,
each time data is written to each of the plurality of target sectors of the second data track, the correction limit prediction unit measures an actual excess amount of the position of the write head, which is displaced beyond the reference radius position in the first direction, updates a cumulative actual excess amount, which is a cumulative total of the actual excess amount, and calculates a first cumulative predicted excess amount obtained by adding the first predicted excess amount to the cumulative actual excess amount, and
the determination unit
causes the write processing unit to continue the write processing for the second data track if determining that the first cumulative predicted excess amount is smaller than or equal to the predicted upper limit threshold value, and
causes the write processing unit to suspend the write processing for the second data track if determining that the first cumulative predicted excess amount exceeds the predicted upper limit threshold value.

2. The magnetic disk device of claim 1, wherein
the plurality of target sectors of the second data track includes an n-th target sector, and an n+1-th target sector following the n-th target sector in a traveling direction of the head for the recording layer,
during the first write period,
the write processing unit executes the write processing up to the n-th target sector of the second data track,
the correction limit prediction unit measures the actual excess amount, updates the cumulative actual excess amount, and calculates the first cumulative predicted excess amount by adding the first predicted excess amount to the cumulative actual excess amount, wherein the first predicted excess amount is an amount at which a position of the write head is expected to be displaced beyond the reference radius position in the first direction if data is assumed to be written to the n+1-th target sector during the first write period,
the determination unit
causes the write processing unit to continue the write processing for the n+1-th target sector of the second data track if determining that the first cumulative predicted excess amount is smaller than or equal to the predicted upper limit threshold value, and
causes the write processing unit to suspend the write processing for the n+1-th target sector of the second data track if determining that the first cumulative predicted excess amount exceeds the predicted upper limit threshold value.

3. The magnetic disk device of claim 1, wherein
if the first distance is less than or equal to a distance for moving the read head by one track in the radial direction, the adjustment unit adjusts the first predicted excess amount to a minimum predicted excess amount, which is a minimum amount, and
if the first distance is more than or equal to a distance for moving the read head by two tracks in the radial direction, the adjustment unit adjusts the first predicted excess amount to an amount more than the minimum predicted excess amount.

4. The magnetic disk device of claim 3, wherein
during the first write period,
the first distance at which the read processing unit moves the read head is more than or equal to a distance for moving the read head by two data tracks,
the first predicted excess amount adjusted by the adjustment unit is more than a minimum amount, and if the determination unit determines that the first cumulative predicted excess amount exceeds the predicted upper limit threshold value,
the correction limit prediction unit calculates a minimum cumulative predicted excess amount by adding the minimum predicted excess amount to the cumulative actual excess amount,
the determination unit
controls the drive of the write processing unit, suspends the write processing for the second data track, maintains the position of the write head in the radial direction, and shifts to a write retry operation of waiting for the disk to rotate and resuming the write processing, if determining that the minimum cumulative predicted excess amount is less than or equal to the predicted upper limit threshold value, and
causes the write processing unit to end the write processing for the second data track and to save the remaining data unable to be written to the second data track to a recording area other than the first data track and the second data track, if determining that the minimum cumulative predicted excess amount exceeds the predicted upper limit threshold value.

5. The magnetic disk device of claim 1, wherein
the plurality of target sectors of the second data track includes an n-th target sector, and an n+1-th target sector following the n-th target sector in a traveling direction of the head for the recording layer,
if the write processing up to the n-th target sector of the second data track is executed during the first write period, the read head is caused to seek after the first write period, and then the write processing is resumed from the n+1-th target sector of the second data track during the second write period,
during the first write period,
the write processing unit executes the write processing up to the n-th target sector of the second data track, and
the correction limit prediction unit measures the actual excess amount, updates the cumulative actual excess amount, and calculates the first cumulative predicted excess amount by adding the first predicted excess amount to the cumulative actual excess amount, wherein the first predicted excess amount is an amount at which a position of the write head is expected to be displaced beyond the reference radius position in the first direction if data is assumed to be written to the n+1-th target sector during the first write period,
during the second write period,
the read processing unit executes second seek processing of seeking the read head, moves the read head at a second distance, and makes the write head face the second data track again,
the adjustment unit derives again a second predicted excess amount at which a position of the write head is expected to be displaced beyond the reference radius position in the first direction during the second write period, the second predicted excess amount corresponding to the second distance,
the correction limit prediction unit recalculates the second cumulative predicted excess amount by adding the second predicted excess amount to the cumulative actual excess amount, wherein the second predicted excess amount is an amount at which a position of the write head is expected to be displaced beyond the reference radius position in the first direction if data is assumed to be written to the n+1-th target sector during the second write period, and
the determination unit
causes the write processing unit to resume the write processing for the n+1-th target sector of the second data track if determining that the second cumulative predicted excess amount is smaller than or equal to the predicted upper limit threshold value, and
causes the write processing unit to suspend the write processing for the n+1-th target sector of the second data track if determining that the second cumulative predicted excess amount exceeds the predicted upper limit threshold value.

6. The magnetic disk device of claim 5, wherein
the period during which the read processing unit executes the second seek processing includes an acceleration period that is a first period, and a deceleration period that is a last period, and
the read processing unit
seeks the read head while gradually increasing a speed in a first seek direction during the acceleration period, and
seeks the read head while gradually reducing a speed in the first seek direction during the deceleration period.

7. The magnetic disk device of claim 1, wherein
the write processing unit is in shingled magnetic recording type of making the data of the second data track overlap with the data of the first data track in an overwrite direction opposite to the first direction and writing the data.

8. A magnetic disk device comprising:
a disk having a first data track and a second data track adjacent to each other in a recording layer, the first data track and the second data track each including a plurality of target sectors being targets to which data is written, the first data track being located in a first direction parallel to a radial direction of the disk as viewed from the second data track;
a head including a write head writing data to the recording layer and a read head reading data from the recording layer;
a read processing unit capable of executing seek processing of seeking the read head;
a write processing unit capable of executing write processing of writing data to the recording layer;
an error correction unit executing error correction of data in one or more corrupted target sectors whose data is determined to be corrupted, among the plurality of target sectors of the first data track;
an adjustment unit;
a correction limit prediction unit; and
a determination unit,
wherein
during a first write period being a period elapsed after the write processing unit executes the write processing for the plurality of target sectors of the first data track and being the period during which the write processing unit executes the write processing for the plurality of target sectors of the second data track,
the read processing unit executes first seek processing of seeking the read head, moves the read head at a first distance, and makes the write head face the second data track, the adjustment unit
- derives a first predicted excess amount at which a position of the write head is expected to be displaced beyond a reference radius position in the first direction during the first write period, the first predicted excess amount being varied in accordance with a distance for seeking the read head, and
- derives a predicted upper limit threshold value indicating a limit of a range in which the error correction for the first data track is executable, the predicted upper limit threshold value having a smaller value as each of predicted excess amounts including the first predicted excess amount is increased, the predicted upper limit threshold value being a variable, each time data is written to each of the plurality of target sectors of the second data track, the correction limit prediction unit measures an actual excess amount of the position of the write head, which is displaced beyond the reference radius position in the first direction, updates a cumulative actual excess amount, which is a cumulative total of the actual excess amount, and calculates a first cumulative predicted excess amount obtained by adding the first predicted excess amount to the cumulative actual excess amount, and the determination unit
- causes the write processing unit to continue the write processing for the second data track if determining that the first cumulative predicted excess amount is smaller than or equal to the predicted upper limit threshold value, and
- causes the write processing unit to suspend the write processing for the second data track if determining that the first cumulative predicted excess amount exceeds the predicted upper limit threshold value.

9. The magnetic disk device of claim 8, wherein
the plurality of target sectors of the second data track includes an n-th target sector, and an n+1-th target sector following the n-th target sector in a traveling direction of the head for the recording layer,
during the first write period,
- the write processing unit executes the write processing up to the n-th target sector of the second data track,
- the correction limit prediction unit measures the actual excess amount, updates the cumulative actual excess amount, and calculates the first cumulative predicted excess amount by adding the first predicted excess amount to the cumulative actual excess amount, wherein the first predicted excess amount is an amount at which a position of the write head is expected to be displaced beyond the reference radius position in the first direction if data is assumed to be written to the n+1-th target sector during the first write period,
- the determination unit
  - causes the write processing unit to continue the write processing for the n+1-th target sector of the second data track if determining that the first cumulative predicted excess amount is smaller than or equal to the predicted upper limit threshold value, and
  - causes the write processing unit to suspend the write processing for the n+1-th target sector of the second data track if determining that the first cumulative predicted excess amount exceeds the predicted upper limit threshold value.

10. The magnetic disk device of claim 8, wherein
if the first distance is less than or equal to the distance for moving the read head by one track in the radial direction, the adjustment unit adjusts the first predicted excess amount to a minimum predicted excess amount, which is a minimum amount, and adjusts the predicted upper limit threshold value to a maximum predicted upper limit threshold, which is a maximum amount, and
if the first distance is more than or equal to the distance for moving the read head by two tracks in the radial direction, the adjustment unit adjusts the first predicted excess amount to an amount larger than the minimum predicted excess amount, and adjusts the predicted upper limit threshold value to an amount smaller than the maximum predicted upper limit threshold value.

11. The magnetic disk device of claim 10, wherein
during the first write period,
if the first distance in which the read processing unit moves the read head is more than or equal to the distance for moving the read head by two data tracks,
if the first predicted excess amount adjusted by the adjustment unit is an amount larger than the minimum amount,
if the predicted upper limit threshold value adjusted by the adjustment unit is a value smaller than the maximum predicted upper limit threshold value, and,
if the determination unit determines that the first cumulative predicted excess amount exceeds the predicted upper limit threshold value,
- the correction limit prediction unit further calculates the minimum cumulative predicted excess amount by adding the minimum predicted excess amount to the cumulative actual excess amount,
- the determination unit
  - controls the drive of the write processing unit, suspends the write processing for the second data track, maintains the position of the write head in the radial direction, and shifts to the write retry operation of waiting for the disk to rotate and resuming the write processing, if determining that the minimum cumulative predicted excess amount is less than or equal to the predicted upper limit threshold value, and
  - causes the write processing unit to end the write processing for the second data track and to save the remaining data unable to be written to the second data track to a recording area other than the first data track and the second data track, if determining that the minimum cumulative predicted excess amount exceeds the predicted upper limit threshold value.

12. The magnetic disk device of claim 8, wherein
the plurality of target sectors of the second data track includes an n-th target sector, and an n+1-th target sector following the n-th target sector in a traveling direction of the head for the recording layer,
if the write processing up to the n-th target sector of the second data track is executed during the first write period, the read head is caused to seek after the first write period, and then the write processing is resumed from the n+1-th target sector of the second data track during a second write period,
during the first write period, the write processing unit executes the write processing up to the n-th target sector of the second data track, the correction limit prediction unit measures the actual excess amount, updates the cumulative actual excess amount, and calculates the first cumulative predicted excess amount by adding the first predicted excess amount to the cumulative actual excess amount, wherein the first predicted excess amount is an amount at which a position of the write head is expected to be displaced beyond the reference radius position in the first direction if data is assumed to be written to the n+1-th target sector during the first write period, during the second write period, the read processing unit executes second seek processing of seeking the read head, moves the read head at a second distance, and makes the write head face the second data track again, the adjustment unit derives again a second predicted excess amount at which a position of the write head is expected to be displaced beyond the reference radius position in the first direction during the second write period, the second predicted excess amount corresponding to the second distance, and adjusts the predicted upper limit threshold value to a value corresponding to the second predicted excess amount, the correction limit prediction unit recalculates the second cumulative predicted excess amount by adding the second predicted excess amount to the cumulative actual excess amount, the second predicted excess amount is an amount at which a position of the write head is expected to be displaced beyond the reference radius position in the first direction if data is assumed to be written to the n+1-th target sector during the second write period, the determination unit causes the write processing unit to resume the write processing for the n+1-th target sector of the second data track if determining that the second cumulative predicted excess amount is smaller than or equal to the predicted upper limit threshold value, and causes the write processing unit to suspend the write processing for the n+1-th target sector of the second data track if determining that the second cumulative predicted excess amount exceeds the predicted upper limit threshold value.

13. The magnetic disk device of claim 12, wherein the period during which the read processing unit executes the second seek processing includes an acceleration period that is a first period, and a deceleration period that is a last period, and the read processing unit causes the read head to seek while gradually increasing the speed in a first seek direction during the acceleration period, and causes the read head to seek while gradually decreasing the speed in the first seek direction during the deceleration period.

14. The magnetic disk device of claim 8, wherein the write processing unit is capable of selecting shingled magnetic recording of making the data of the second data track overlap with the data of the first data track in an overwrite direction opposite to the first direction and writing the data.

\* \* \* \* \*